(12) United States Patent
Hawkins et al.

(10) Patent No.: US 10,528,863 B2
(45) Date of Patent: Jan. 7, 2020

(54) FEEDBACK MECHANISMS IN SEQUENCE LEARNING SYSTEMS WITH TEMPORAL PROCESSING CAPABILITY

(71) Applicant: Numenta, Inc., Redwood City, CA (US)

(72) Inventors: Jeffrey C. Hawkins, Atherton, CA (US); Subutai Ahmad, Palo Alto, CA (US)

(73) Assignee: Numenta, Inc., Redwood City, CA (US)

( * ) Notice: Subject to any disclaimer, the term of this patent is extended or adjusted under 35 U.S.C. 154(b) by 704 days.

(21) Appl. No.: 15/089,175

(22) Filed: Apr. 1, 2016

(65) Prior Publication Data

US 2017/0286846 A1 Oct. 5, 2017

(51) Int. Cl.
*G06N 3/04* (2006.01)
*G06N 3/08* (2006.01)
*G06N 5/04* (2006.01)

(52) U.S. Cl.
CPC .......... *G06N 3/0454* (2013.01); *G06N 3/049* (2013.01); *G06N 3/0472* (2013.01); *G06N 3/084* (2013.01); *G06N 5/047* (2013.01)

(58) Field of Classification Search
CPC ........ G06N 3/084; G06N 5/047; G06N 7/005; G06N 99/005; G06N 3/082
See application file for complete search history.

(56) References Cited

U.S. PATENT DOCUMENTS

| | | | | |
|---|---|---|---|---|
| 9,524,461 | B1* | 12/2016 | Huynh | G06N 3/04 |
| 2002/0038294 | A1* | 3/2002 | Matsugu | G06K 9/00973 |
| | | | | 706/20 |
| 2011/0225108 | A1* | 9/2011 | Hawkins | G06N 3/049 |
| | | | | 706/12 |
| 2014/0067734 | A1* | 3/2014 | Hawkins | G06N 5/02 |
| | | | | 706/12 |
| 2015/0269481 | A1* | 9/2015 | Annapureddy | G06N 3/0445 |
| | | | | 706/21 |
| 2017/0091615 | A1* | 3/2017 | Liu | G06N 3/0445 |

OTHER PUBLICATIONS

Ahmad, S. et al., "How do neurons operate on sparse distributed representations? A mathematical theory of sparsity, neurons and active dendrites", Numenta, Inc., Redwood City, CA, Jan. 5, 2016, 17 pages.

(Continued)

*Primary Examiner* — Hal Schnee
(74) *Attorney, Agent, or Firm* — Fenwick & West LLP

(57) ABSTRACT

Embodiments relate to a first processing node that processes an input data having a temporal sequence of spatial patterns by retaining a higher-level context of the temporal sequence. The first processing node performs temporal processing based at least on feedback inputs received from a second processing node. The first processing node determines whether learned temporal sequences are included in the input data based on sequence inputs transmitted within the same level of a hierarchy of processing nodes and the feedback inputs received from an upper level of the hierarchy of processing nodes.

23 Claims, 12 Drawing Sheets

(56) References Cited

OTHER PUBLICATIONS

Ahmad, S. et al., "Properties of Sparse Distributed Representations and their Application to Hierarchical Temporal Memory", Numenta, Inc., Redwood City, CA, Mar. 24, 2015, 18 pages.
Billaudelle, A. et al., "Porting HTM Models to the Heidelberg Neuromorphic Computing Platform", Numenta, Inc., Redwood City, CA, version 2, Feb. 9, 2016, nine pages.
Billaudelle, A. et al., "Porting HTM Models to the Heidelberg Neuromorphic Computing Platform", Numenta, Inc., Redwood City, CA, version 1, May 8, 2015, ten pages.
Cui, Y, et al., "Continuous online sequence learning with an unsupervised neural network model", Numenta, Inc., Redwood City, CA, Dec. 10, 2015, 13 pages.
Hawkins, J. et al., "Why Neurons Have Thousands of Synapses, A Theory of Sequence Memory in Neocortex", Numenta, Inc., Redwood City, CA, version 2, Dec. 1, 2015, 20 pages.
Hawkins, J. et al., "Why Neurons Have Thousands of Synapses, A Theory of Sequence Memory in Neocortex", Numenta, Inc., Redwood City, CA, version 1, Oct. 30, 2015, 20 pages.
Lavin, A. et al., "Evaluating Real-time Anomaly Detection Algorithms—the Numenta Anomaly Benchmark", *14th International Conference on Machine Learning and Applications*, Miami, FL, Dec. 9-11, 2015, version 4, Nov. 17, 2015, eight pages.
Lavin, A. et al., "Evaluating Real-time Anomaly Detection Algorithms—the Numenta Anomaly Benchmark", *14th International Conference on Machine Learning and Applications*, Miami, FL, Dec. 9-11, 2015, version 3, Nov. 16, 2015, eight pages.
Lavin, A. et al., "Evaluating Real-time Anomaly Detection Algorithms—the Numenta Anomaly Benchmark", *14th International Conference on Machine Learning and Applications*, Miami, FL, Dec. 9-11, 2015, version 2, Oct. 13, 2015, eight pages.
Lavin, A. et al., "Evaluating Real-time Anomaly Detection Algorithms—the Numenta Anomaly Benchmark", *14th International Conference on Machine Learning and Applications*, Miami, FL, Dec. 9-11, 2015, version 1, Oct. 12, 2015, eight pages.
MIT Technology Review, "Single Artificial Neuron Taught to Recognize Hundreds of Patterns," Nov. 12, 2015, six pages. [Online] [Retrieved Nov. 18, 2015] Retrieved from the internet <http://www.technologyreview.com/ . . . etter&utm_campaign=ef674243f3-Newsletter_November_2015_11_16_2015&utm_medium=email&utm_term=0_23e65d3407-ef674243f3-303250977>.
Purdy, S., "Encoding Data for HTM Systems", Numenta, Inc., Redwood City, CA, Feb. 18, 2016, 11 pages.

* cited by examiner

US 10,528,863 B2

FEEDBACK MECHANISMS IN SEQUENCE LEARNING SYSTEMS WITH TEMPORAL PROCESSING CAPABILITY

BACKGROUND

1. Field of the Disclosure

The present disclosure relates to learning and processing spatial patterns and temporal sequences in a temporal memory system.

2. Description of the Related Arts

Hierarchical Temporal Memory (HTM) systems represent a new approach to machine intelligence. In an HTM system, training data including temporal sequences and/or spatial patterns are presented to a network of nodes. The HTM network then builds a model of the statistical structure inherent to the spatial patterns and temporal sequences in the training data, and thereby learns the underlying 'causes' of the temporal sequences of patterns and sequences in the training data. The hierarchical structures of the HTM system enables modeling of very high dimensional input spaces using reasonable amounts of memory and processing capacity.

The training process of the HTM system is largely a form of unsupervised machine learning. During a training process, one or more processing nodes of the HTM system form relationships between temporal sequences and/or spatial patterns present in training input and their associated causes or events. During the learning process, indexes indicative of the cause of events corresponding to the training input may be presented to the HTM system to allow the HTM system to associate particular categories, causes, or events with the training input.

Once an HTM system has built a model of a particular input space, it can perform inference or prediction. To perform inference or prediction, a novel input including temporal sequences or spatial patterns is presented to the HTM system. During the inference stage, each node in the HTM system produces an output that can be more invariant and temporally stable than its input. In other words, the output from a node in the HTM system is more abstract and invariant compared to its input. At its highest node, the HTM system will generate an output indicative of the underlying cause or event associated with the novel input.

SUMMARY

Embodiments relate to temporal processing of input data that change over time. A first processing node receives input data, and in response, generates a series of sparse distributed vectors over time by performing spatial pooling on the input data at the first processing node. Temporal processing is performed on the series of sparse distributed vectors at the first processing node. Specifically, temporal processing includes at least generating sequence inputs varying over time based on the series of sparse distributed vectors, transmitting the sequence inputs via lateral connections within the first processing node, receiving feedback inputs from a second processing node via first feedback connections, and determining whether one or more learned temporal sequences of spatial patterns are included in the input data based on the transmitted sequence inputs and the received feedback inputs. Output data indicating at least prediction or detection of one or more spatial patterns or one or more temporal sequences in the input data is sent from the first processing node to the second processing node.

BRIEF DESCRIPTION OF THE DRAWINGS

The teachings of the embodiments can be readily understood by considering the following detailed description in conjunction with the accompanying drawings.

DETAILED DESCRIPTION OF EMBODIMENTS

Figures 1A, 1B:
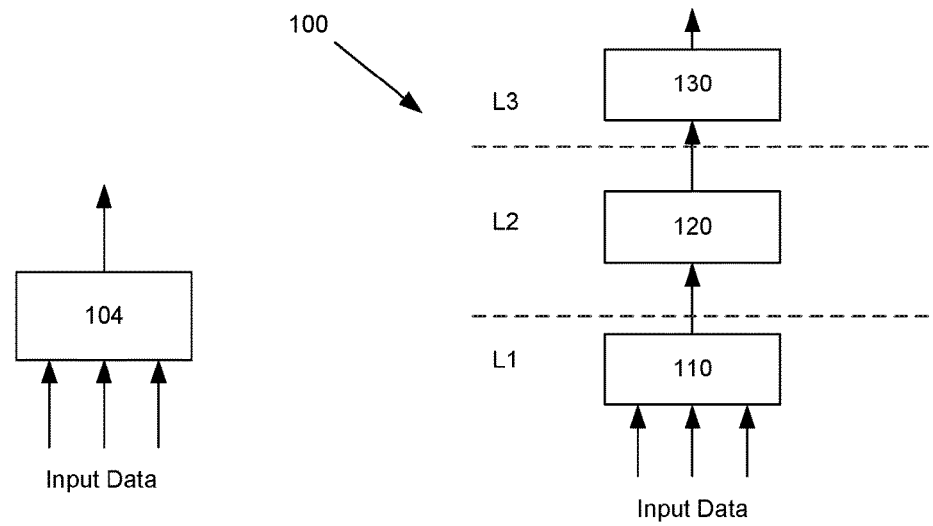
FIG. 1A is a conceptual diagram of a single processing node in a non-hierarchical system, according to one embodiment.
FIG. 1B is a conceptual diagram illustrating an hierarchical temporal memory (HTM) system including three layers of processing nodes, according to one embodiment.

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements. Also in the figures, the left most digits of each reference number corresponds to the figure in which the reference number is first used.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The language used in the specification has been principally selected for readability and instructional purposes, and may not have been selected to delineate or circumscribe the inventive subject matter. Accordingly, the disclosure set forth herein is intended to be illustrative, but not limiting, of the scope, which is set forth in the claims.

Embodiments relate to a lower processing node in a hierarchical temporal memory (HTM) for processing an input data having temporal sequences of spatial patterns by using feedback connections from an upper processing node. The lower processing node performs temporal processing based at least on feedback inputs received from an upper processing node. The lower processing node determines whether learned temporal sequences are included in the input data based on sequence inputs transmitted within the same level of a hierarchy of processing nodes and the feedback inputs received from an upper level of the hierarchy of processing nodes. The information received through the feedback connections is indicative of a higher-level context of the temporal sequence, and hence, more accurate prediction and/or detection of temporal sequences in the input data can be made by using the information from the feedback connections.

Architecture of Temporal Memory System

A temporal memory system stores temporal relationships in sequences of spatial patterns and generates useful information based on the stored relationships. The useful information may include, for example, prediction of spatial patterns to be received, identification of spatial patterns, or a higher level cause associated with the spatial patterns in input data. The temporal memory system may be of a non-hierarchical structure or be of a hierarchical structure.

FIG. 1A is a conceptual diagram of a single processing node 104 in a non-hierarchical system. The processing node 104 receives input data, processes temporal sequences in the input data and generates an output. The output of the processing node 104 is based on the temporal relationships between spatial patterns. For example, the output may indicate prediction on what spatial patterns are to follow or indicate how well the prediction matched a subsequent spatial pattern in the input data.

FIG. 1B is a conceptual diagram of processing nodes organized in a hierarchical manner. Such a hierarchically structured temporal memory system is referred to as a Hierarchical Temporal Memory (HTM) system. In an HTM system, multiple processing nodes learn, predict, and infer input at different levels of abstraction. An example HTM system 100 of FIG. 1B comprises three levels where each level L1, L2, and L3 includes one processing node 110, 120, and 130, respectively. HTM system 100 has three levels L1, L2, L3, with level L1 being the lowest level, level L3 being the highest level, and level L2 being an intermediate level between levels L1 and L3. Processing node 110 at the lowest level L1 receives a sensed input that changes over time. Processing node 110 processes the sensed input and outputs a signal that is fed to its parent node 120 at level L2. Processing node 120 at level L2 in turn processes the signal from processing node 120 and outputs a signal to processing node 130 at the highest level L3. Processing node 120 outputs a signal that represents likely causes or events associated with the input data.

The HTM system 100 has three levels L1, L2, and L3, where level L1 is the lowest level, level is L3 is the highest level, and level L2 is an intermediate level between levels L1 and L3. Processing node 110 at the lowest level L1 receives a sensed input that changes over time. Processing node 110 processes the sensed input and outputs a signal that is fed to its parent node 120 at level L2. Processing node 120 at level L2 in turn processes the signal from processing node 120 and outputs a signal to processing node 130 at the highest level L3. Processing node 120 outputs a signal that represents likely causes or events associated with the input data.

Each processing node 110, 120, 130 may perform spatial pooling and/or temporal processing, as described below in detail with reference to FIG. 4. As a result, the output signals from each processing node 110, 120, 130 are more abstract or invariant over time compared to their input signals. In one embodiment, the top node 130 generates a final output of HTM system 100 that is of the highest abstraction (e.g., likely causes or events) among the outputs generated in HTM system 100. The final output may include distributions indicating likelihood that certain causes or events are associated with the sensed input.

Some of the functions performed by a processing node include, for example, spatial pooling and temporal processing. Spatial pooling herein refers to the process of mapping a set of distinct but similar spatial patterns into a spatial co-occurrence. Temporal processing may include, but is not limited to, learning temporal sequences, performing inference, recognizing temporal sequences, predicting temporal sequences, labeling temporal sequences, and temporal pooling. Learning temporal sequences herein refers to one or more of initializing, expanding, contracting, merging, and splitting temporal sequences. Predicting temporal sequences herein refers to assessing the likelihood that certain spatial patterns will appear subsequently in the input data. Temporal pooling herein refers to processing input data to provide an output that is more stable and invariable over time compared to spatial patterns in the input data. Hardware, software, firmware, or a combination thereof for performing spatial pooling is hereinafter referred to as a spatial pooler. Hardware, software, firmware or a combination thereof for performing the temporal processing is hereinafter referred to as a sequence processor. The sequence processor may perform one or more of learning temporal sequences, performing inference, recognizing temporal sequences, predicting temporal sequences, labeling temporal sequences and temporal pooling.

In one embodiment, a processing node includes only a sequence processor or the spatial pooler. For example, nodes at the first level of the HTM system may consist of processing nodes having only spatial poolers, and the nodes at the second level of the HTM system may consist of processing nodes having only sequence processors. Processing nodes performing other functions (e.g., filtering) may also be placed within the HTM system. Alternatively, a processing node may include two or more levels of interconnected sequence processors or spatial poolers.

Figure 2:
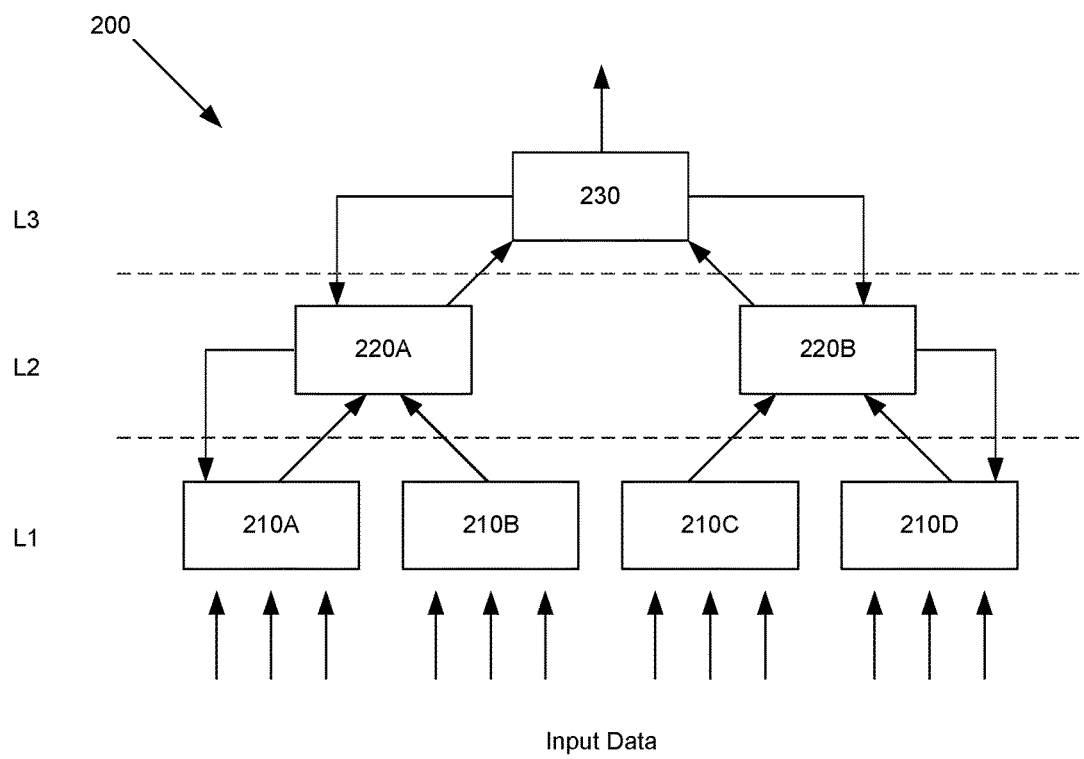
FIG. 2 is a conceptual diagram illustrating an HTM system with multiple processing nodes at lower levels, according to one embodiment.

The processing nodes of the HTM system may be arranged so that the number of processing nodes decreases as level increases. FIG. 2 is a diagram illustrating HTM system 200 having three levels L1, L2, and L3, where level L1 is the lowest level, level L3 is the highest level, and level L2 is an intermediate level between levels L1 and L3. HTM system 200 is hierarchically structured so that the processing nodes cover a larger input space as the level ascends. Level L1 has nodes 210A, 210B, 210C, and 210D; level L2 has nodes 220A and 220B; and level L3 has node 230. Nodes 210A, 210B, 210C, 210D, 220A, 220B, and 230 are hierarchically connected in a tree-like structure such that each processing node has several children nodes (that is, nodes connected at a lower level) and one parent node (that is, node connected at a higher level).

Further, HTM system 200 propagates bottom-up signals up the hierarchy and propagates top-down signals down the hierarchy. That is, each processing node 210A, 210B, 210C, 210D, 220A, 220B, and 230 may be arranged (i) to propagate information up the HTM hierarchy to a connected parent node, and (ii) to propagate information down the HTM hierarchy to any connected children nodes.

The number of levels and arrangement of processing modes in FIGS. 1 and 2 are merely illustrative. Many variants of an HTM system may be developed and deployed depending on the specific application. For example, the number of levels may be increased to provide different levels of abstraction/invariance or to accommodate different types of sensed inputs (e.g., visual data and audio data). Further, a parent node may also receive partially overlapping bottom-up signals from multiple children nodes. An external supervision signal may also be fed to each of the processing nodes to enhance spatial and/or temporal processing performance.

In one embodiment, one or more nodes of the temporal memory system receives sensed inputs representing images, videos, audio signals, sensor signals, data related to network traffic, financial transaction data, communication signals (e.g., emails, text messages and instant messages), documents, insurance records, biometric information, parameters for manufacturing process (e.g., semiconductor fabrication parameters), inventory counts, energy or power usage data, data representing genes, results of scientific experiments or parameters associated with operation of a machine (e.g., vehicle operation), or medical treatment data. The temporal memory system may process such inputs and produce an output representing, among others, identification of objects shown in an image, identification of recognized gestures, classification of digital images as pornographic or non-pornographic, identification of email messages as unsolicited bulk email ('spam') or legitimate email ('non-spam'), prediction of a trend in financial market, prediction of failures in a large-scale power system, identification of a speaker in an audio recording, classification of loan applicants as good or bad credit risks, identification of network traffic as malicious or benign, identification of a person appearing in the image, interpretation of meaning using natural language processing, prediction of a weather forecast, identification of patterns in a person's behavior, generation of control signals for machines (e.g., automatic vehicle navigation), determination of gene expression and protein interactions, determination of analytic information describing access to resources on a network, determination of parameters for optimizing a manufacturing process, prediction of inventory, prediction of energy usage in a building or facility, predictions of links or advertisement that users are likely to click, identification of anomalous patterns in insurance records, prediction of experiment results, indication of illness that a person is likely to experience, selection of contents that may be of interest to a user, prediction of a person's behavior (e.g., ticket purchase, no-show behavior), prediction of election results, prediction or detection of adverse events, identification of a string of text in an image, identification of a topic in text, and a prediction of a patient's reaction to medical treatments. The underlying representation (e.g., image, audio, video, text) can be stored in a non-transitory, computer-readable storage medium.

Structure of Example Processing Node and Overall Process

Figure 3:
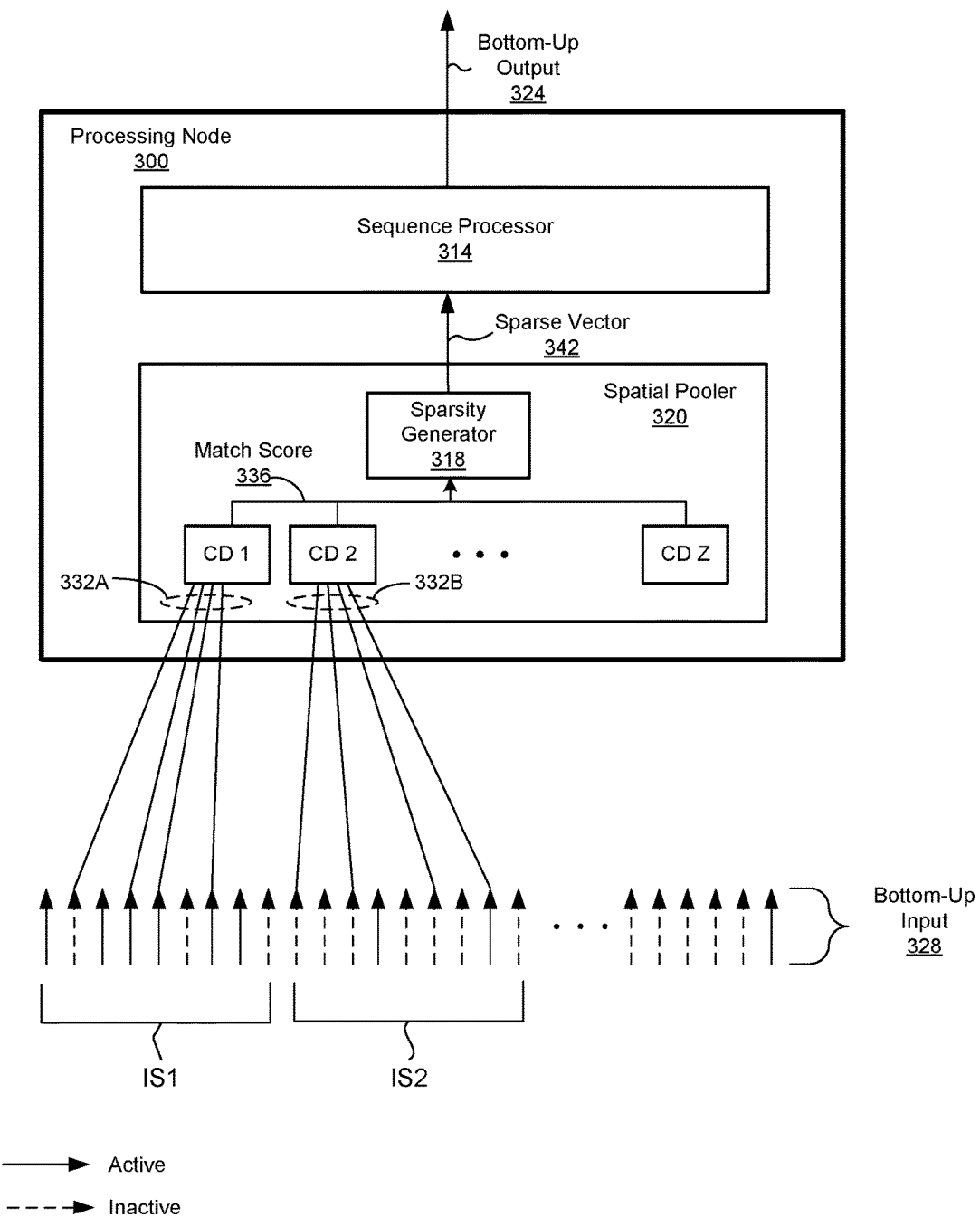
FIG. 3 is a block diagram illustrating a processing node of an HTM system, according to one embodiment.

FIG. 3 is a block diagram illustrating processing node 300 in a temporal memory system, according to one embodiment. The processing node 300 may be a stand-alone node for operating without other processing nodes. Alternatively, the processing node 300 may be part of a hierarchy of processing nodes, for example, as described above in detail with reference to FIGS. 1A through 2. Particularly, the processing node 300 may be the lowest node 240A receiving sensor data and action data as its input, whereas upper processing nodes are embodied using a different structure as described below in detail with reference to FIG. 10.

Processing node 300 may include, among other components, a sequence processor 314 and a spatial pooler 320. Spatial pooler 320 receives bottom-up input 328, performs spatial pooling, and sends sparse vector 342 in a sparse distributed representation to sequence processor 314. The sparse vector 342 includes information about patterns detected in the bottom-up input 328. For a processing node 300 at the lowest level, the bottom-up input 328 may be sensed input. For processing nodes at intermediate and top levels, the bottom-up input 328 may be a bottom-up output from a child node or children nodes. The spatial pooling is described below in detail with reference to FIG. 5. The processing nodes at different hierarchical levels may have a different structure, for example, as described below in detail with reference to FIG. 10.

Sequence processor 314 receives the sparse vector 342, performs temporal processing and generates the bottom-up output 324. The bottom-up output 324 represents information describing temporal sequences detected or predicted in the spatial patterns of the bottom-up input 328. Bottom-up output 324 is fed to a parent node, which may have a similar or the same structure as processing node 300.

Figure 4:
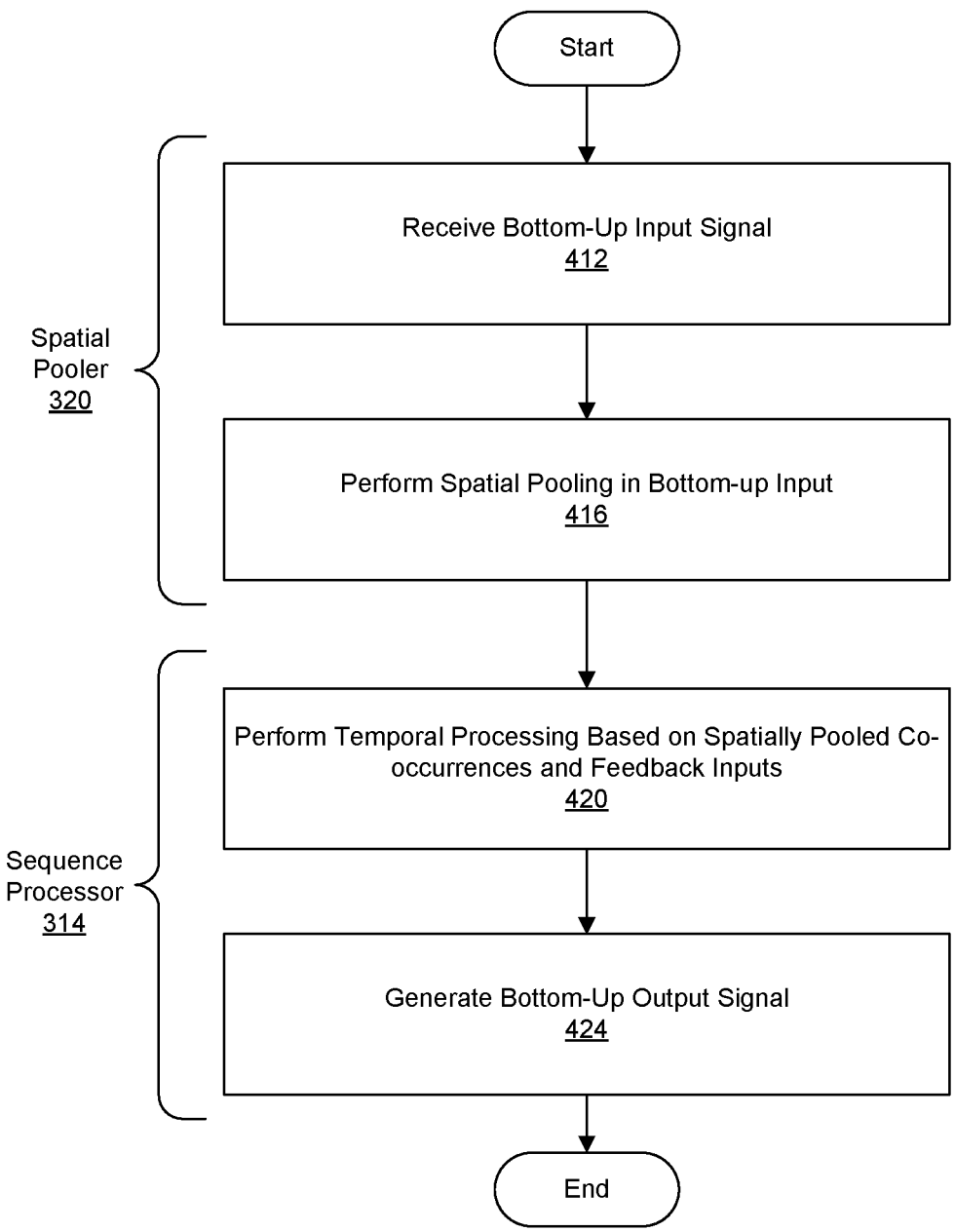
FIG. 4 is a flowchart illustrating an overall process in a processing node of an HTM system, according to one embodiment.

FIG. 4 is a flowchart illustrating an overall process at processing node 300, according to one embodiment. Spatial pooler 320 receives 412 bottom-up input 328. Then spatial pooler 320 performs 416 spatial pooling for co-occurrences detected in bottom-up input 328, as described below in detail with reference to FIG. 5A. As a result, spatial pooler 342 generates sparse vector 342 that is sent to sequence processor 314.

Sequence processor 314 receives sparse vector 342 and performs 420 temporal processing based on spatially pooled co-occurrences, and feedback inputs, as described below in detail with reference to FIG. 6. Feedback inputs are information received from processing nodes in levels above the processing node 300 regarding the temporal sequences detected or predicted in the spatial patterns of the bottom-up input 328. Sequence processor 314 then generates 424 bottom-up output 324 that is sent to a parent node.

The process described in FIG. 4 is merely illustrative. Various additional steps may be added, and certain steps may be omitted from the step depending on the structure and function of the processing nodes.

Spatial Pooling Using Local Inhibition

Spatial pooler 320 performs spatial pooling by producing the sparse vector 342 in the form of a sparse distributed representation. In a sparse distributed representation, a number of elements in the sparse vector 342 are inactive (e.g., assigned a value of zero) while the remaining elements are active (e.g., assigned a value of one). For example, sparse vector 342 may have approximately 10% of its elements active while approximately 90% of its elements are inactive. The percentage of active elements may be fixed (i.e., a fixed-sparsity representation) or the percentage of active elements may change over time.

Spatial pooling is the process of grouping similar spatial patterns and representing these spatial patterns using a single vector. Taking an example of processing input data for 100×100 input space (i.e., 10,000 elements), the total number of unique spatial patterns is $2^{10,000}$, assuming that each element of the input data is binary (i.e., zero or one).

Referring to FIG. 3, spatial pooler 320 includes, among other components, a sparsity generator 318 and a plurality of co-occurrence detectors (CDs) 1 through Z. CDs detect co-occurrences in bottom-up input 328, and generate match scores 336. Match scores 336 indicate the degree of match between a spatial pattern of the bottom-up input 328 and a co-occurrence pattern associated with each CD. In one embodiment, a higher match score indicates more overlap between bottom-up input 328 and the associated co-occurrence pattern of each CD. The match scores 336 are provided to the sparsity generator 318. In response, the sparsity generator 318 generates sparse vector 342 in the form of a sparse distributed representation.

In one embodiment, each CD is mapped to a subset of elements in the bottom-up input 328 within predefined input space. As illustrated in FIG. 3 by lines extending from CD 1 to a subset of arrows of bottom-up input 328, CD 1 is mapped to receive a subset 332A of elements of the bottom-up input 328 within input space IS1. Similarly, CD 2 is mapped to receive a subset of elements of the bottom-up input 328 within input space IS2. Although illustrated in FIG. 3 as one-dimensional for the sake of simplification, the input space (e.g., IS1, IS2) may consist of two or more dimensions.

The input space of each CD may be mutually exclusive or may partially overlap. Also, each CD may be mapped to receive the same number of input elements or a different number of input elements. Each input element could be binary or contain scalar values. In one embodiment, CDs are arranged to have topological relationships to their input space. For example, adjacent CDs cover adjacent portions of input space.

The sparsity generator 318 collects the match scores 336 from the CDs, selects a number of CDs satisfying conditions based on their match scores and match scores of nearby CDs to generate sparse vector 342. In one embodiment, when a CD becomes dominant (e.g., the CD has a high match score), the CD inhibits selection of other CDs within a predetermined range (hereinafter referred to as "an inhibition range"). The inhibition range may extend only to CDs immediately adjacent to the dominant CD or may extend to CDs that are separated from the dominant CD by a predetermined distance. Alternatively, sparsity generator 318 may select a subset of CDs with highest match scores among all CDs in the processing node 300.

In one embodiment, the inhibition range of processing nodes increases at a higher level of the HTM system compared to the inhibition range of processing nodes at a lower level of the HTM system. The inhibition ranges of the processing nodes may be set so that the densities of the sparse vectors in the processing nodes at different levels are the same or within a predetermined range. The processing nodes at a higher level cover a larger range of input space than the processing nodes at a lower level. Hence, in order to achieve the same level of density across different levels of processing nodes, the inhibition range for processing nodes may be increased as the level in the hierarchy increases.

In one embodiment, a greedy winner selection algorithm is used to select the dominant CD.

In an example of sparse vector 342, elements corresponding to the chosen CDs are indicated as being active, and elements corresponding to unselected CDs are indicated as being inactive. Assume that the spatial pooler includes 10 CDs of which the first CD and the fourth CD were selected for high match scores. In this example, the sparse vector may be (1, 0, 0, 1, 0, 0, 0, 0, 0, 0), where the first and fourth elements are active but other elements are inactive. The density of the spatial vector representing the ratio of selected CDs among all CDs is governed by the inhibition range and the selection threshold value (the density of sparse vector 342 increases as the as the percentage of selected CDs increases). As the inhibitory range of a dominant CD increases, the density of the sparse vector 342 decreases. Further, as the selection threshold value increases, the density of the sparse vector increases. Conversely, as the inhibitory range of a dominant CD decreases, the density of the sparse vector 342 increases. Also, as the selection threshold value decreases, the density of the sparse vector 342 decreases. The combination of inhibitory range and the selection threshold value maintains the density of sparse vector 342 within a certain range. Alternatively, a fixed number of CDs may be selected from all CDs based on the match scores (e.g., a certain number of CDs with highest match scores).

When a new spatial pattern is presented, the match scores from the CDs may be updated accordingly. The updated match scores may prompt changes in sparse vector 342. In one embodiment, sparsity generator 318 implements hysteresis by retaining a previously chosen CD in the top CDs until a competing CD has a match score exceeding the match score of the chosen CD by a threshold score (e.g., a match score 20% higher). In this way, the sparse vector becomes more stable over time and more robust to noise.

Figure 5:
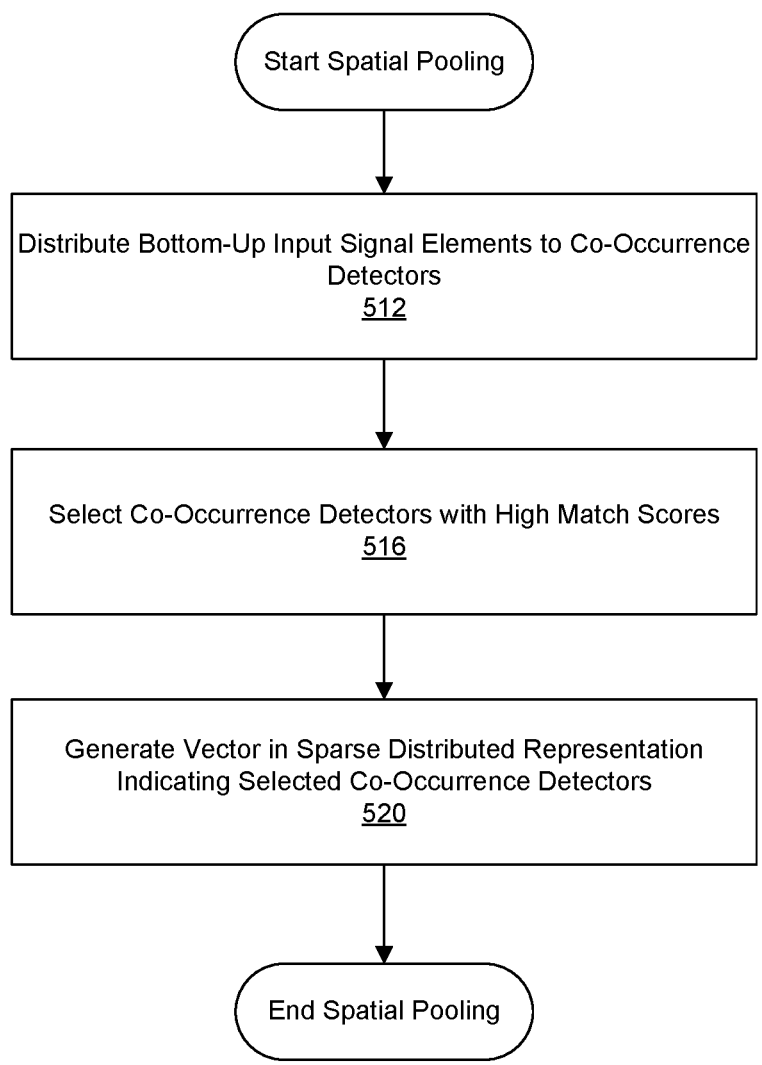
FIG. 5 is a flowchart illustrating a method of performing spatial pooling in a processing node, according to one embodiment.

FIG. 5 is a flowchart illustrating a method of performing spatial pooling in processing node 300, according to one embodiment. First, the elements of bottom-up input 328 are sent 512 to CDs according to the mappings between the input elements of the bottom-up input 328 and CDs.

Each CD then generates a match score indicating the extent to which a co-occurrence pattern associated with the CD matches the received input elements. Based on the match scores 336 from CDs, sparsity generator 318 selects 516 CDs that have high match scores 336. In selecting the CDs, local inhibition may be employed to partially or entirely exclude CDs within an inhibition range of a dominant CD. As a result of the selection, a subset of CDs is selected from the entire CDs (e.g., 50 CDs are selected from a total of 500 CDs). Sparsity generator 318 then generates 520 sparse vector 342 in the form of a sparse distributed representation to indicate the selected CDs.

Since each sparse vector may represent one or more spatial patterns, the spatial pooling achieves abstraction and generalization in spatial domain. A sparse vector 342 that changes over time is then provided to sequence processor 314 to perform abstraction and generalization in the temporal domain.

Temporal Processing in Sequence Processor

Temporal processing includes various time-based processing of spatial patterns such as recognizing, predicting, or labeling of temporal sequences. Sequence processor 314 learns and stores transitions between spatial patterns as represented by sparse vector 342. Based on the learned transitions, sequence processor 314 recognizes and predicts the same or similar transitions in a new input signal. Embodiments provide a temporal processing mechanism that takes advantage of the characteristics of sparse distributed representation vectors to learn, recognize, and predict temporal sequences of spatial patterns or parts of spatial patterns.

Sequence processor 314 may learn, store and detect temporal sequences of different lengths (also referred to as "variable order" temporal processing). The variable order temporal processing enables learning and detection of more temporal sequences and enhances prediction, inference, or other capabilities of the processing node.

Sequence processor 314 may also learn, store, and detect temporal sequences while performing inference, prediction or other temporal processing (also referred to as "online learning"). The online learning combines a learning (or training) phase and a temporal processing (e.g., predicting) phase into a single phase. By combining two distinct phases into a single phase, sequence processor 314 can process information in a more time-efficient manner.

In one embodiment, the sequence processor 314 receives a sparse vector 342 that remain constant until a next discrete time steps. A time step herein refers to a division of time for performing digital processing at the processing node 300. During each time step, the sparse vector 342 is assumed to maintain a particular set of values. For instance, the sparsity generator 318 periodically samples the match score 336 to output a sparse vector 342 that may be updated after each time step. Alternatively or additionally, the bottom-up input 328 is converted into discrete values at discrete time steps, and the processing node 300 determines values at discrete time steps. Accordingly, the sequence processor 314 may learn, store, and detect temporal sequences of values that are updated over discrete time steps. Using discrete time steps is advantageous, among other reasons, because computational complexity is reduced.

Figure 6:
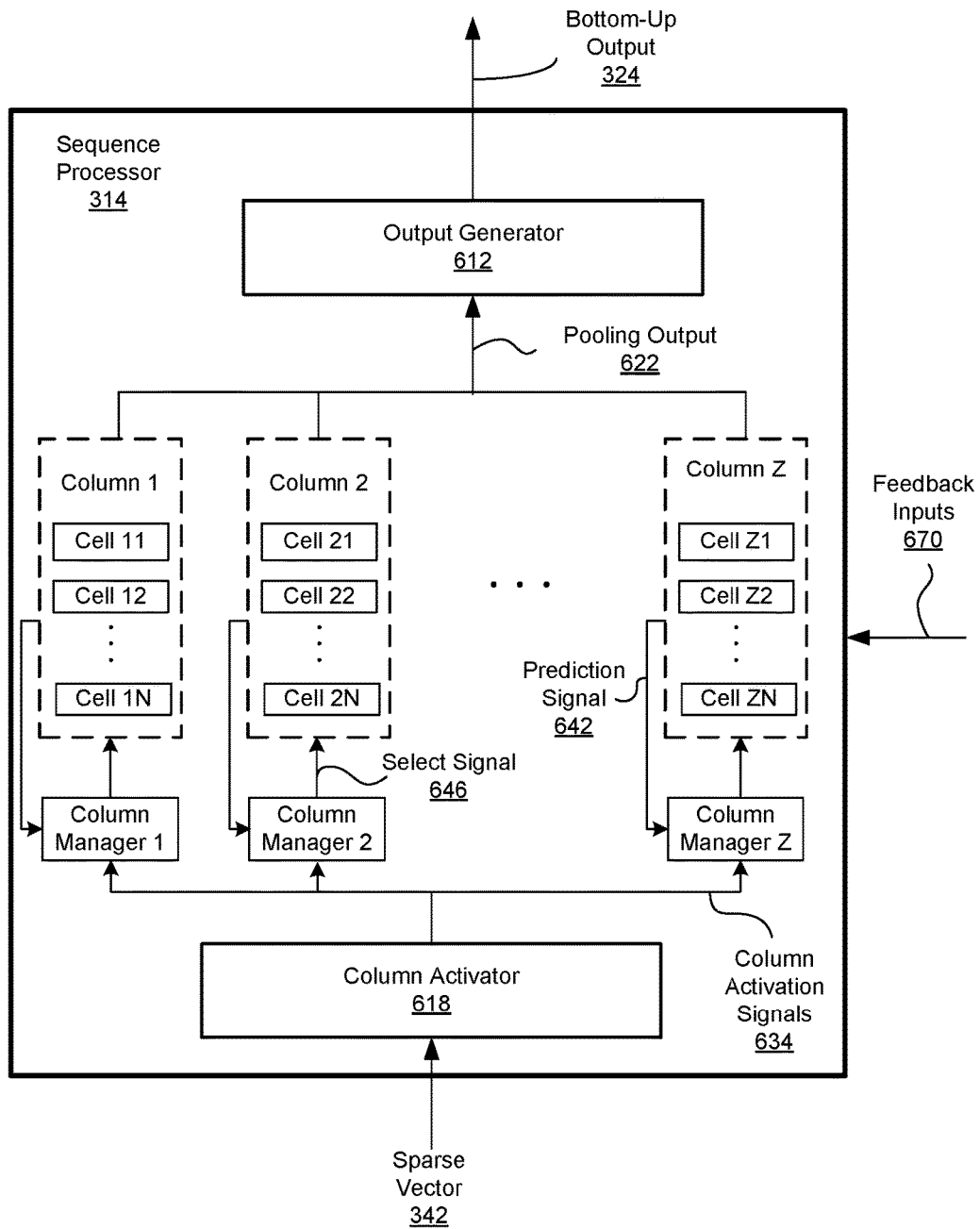
FIG. 6 is a block diagram illustrating a sequence processor in a processing node, according to one embodiment.

FIG. 6 is a block diagram illustrating sequence processor 314, according to one embodiment. Sequence processor 314 may include, among other components, output generator 612, columns of cells (in dashed boxes), column managers, and column activator 618. The column activator 618 receives sparse vector 342 from spatial pooler 320. In response, column activator 618 generates column activation signals 634 indicating which columns to be activated based on sparse vector 342. The sequence processor 314 also receives feedback inputs 670 from one or more processing nodes in levels above the processing node 300 in the hierarchically structured processing nodes. The feedback inputs 670 are fed to cells in the sequence processor 314 through feedback connections, as described below in detail with reference to FIG. 9.

The number of total columns may coincide with the total number of elements in sparse vector 342. The column activator 618 receives sparse vector 342 and determines which elements of sparse vector 342 are active. Then, column activator 618 sends column activation signals 634 to corresponding columns to activate these columns.

In one embodiment, each column includes the same number (N) of cells. A cell has three states: inactive, predictive, and active. A cell becomes activated (i.e., in an active state) in response to activation by the select signal 646. When a cell in a column becomes activated, the active cell inhibits activation of other cells in the same column except in certain limited circumstances. The predictive state represents a prediction that the cell will be activated by the select signal 646 at a next time step. A cell becomes predictive (i.e., in a predictive state) in response to current sequence outputs from other cells in the same processing node 300 or level. A cell may also become predictive in response to current feedback inputs 670 from other cells in upper processing nodes and levels. For example, an input from a higher-level node represents context used to predict cell activation corresponding to behavior generated in response to the context. Alternatively or additionally, the cell becomes predictive due to inputs from other nodes and sequence inputs. As another example, an input from a lower-level node represents a change in orientation or position of a sensor used to predict cell activation corresponding to recognition of a pattern from the sensor input. In some embodiments, a cell may simultaneously be activated and predictive. In some embodiments, a cell is either activated or predictive, and a cell having inputs meeting conditions to make the cell both active and predictive becomes active. A cell that is in neither an active state nor a predictive state is referred to as inactive (i.e., in an inactive state).

Each column is connected to an associated column manager. The column manager receives the column activation signal 634, determines activation states of cells in the column (based on prediction signal 642), and sends select signal 646 to activate one or more cells in the column under certain circumstances. The prediction signal 642 identifies which cells in the column are in a predictive state. In one embodiment, the column manager sends the select signal 646 to one or more cells in the column to activate those cells in response to the column activation signal 634.

In one embodiment, the column manager selects the cells to activate according to the prediction signal 642. For example, the column manager selects one or more of the cells in the column that are currently in a predictive state (as indicated by the prediction signal 642). Continuing the example, if the prediction signal 642 indicates that no cell in the column is currently in a predictive state, the column manager selects one or more of the cells (e.g., all of the cells in the column) to activate. When no cell in the column is currently in a predictive state, the column manager may select a cell in the column for activation based on how recently the cell was activated. Specifically, the cell most recently activated in the column may be selected for activation. If no prior activated cell exists, then the best matching cell or the least used cell may be chosen for activation. Alternatively, the column manager may activate all cells in the column if no cell is currently in a predictive state.

In another embodiment, the column manager selects one or more cells in the column even though the prediction signal 642 indicates that other cells are in the predictive state. For example, the column manager may select the cell to learn the connections randomly or according to a predetermined list. The column manager sends the select signal 646 to activate the selected cells. The selected cells then learn a temporal sequence by making connections to active cells in other columns and/or by making connections to active cells in levels above the processing node 300, as described below in detail with reference to FIGS. 7 and 8. The selected cells may also make connections to any combinations of active cells in other processing nodes (including processing nodes at lower levels than the processing node 300), inputs from different levels, and action information.

The cells individually, or collectively as a column, send pooling output 622 to output generator 612. The pooling output 622 identifies the state of the cells. For instance, the pooling output 622 indicates which cells are activated and/or which cells are predictive. In certain applications (e.g., flash inference), a column generates a pooling output 622 to indicate whether any of the cells in the column are activated. In such application, once any cell in the column is activated, the column sends a pooling output 622 indicating that the column is active. The pooling output may be represented as a binary value such as a two-bit binary value, with one bit indicating whether the cell is activated and one bit indicating whether the cell is predictive. Although the pooling output 622 takes a binary value in most cases, the pooling output 622 may also be a non-binary value. For example, the pooling output 622 may include an integer or real-number value indicating the strength of the cell's cell activated state or predictive state.

In one embodiment, output generator 612 collects the pooling outputs 622 from the cells or columns and concatenates these outputs into a vector. The concatenated vector may be sent as bottom-up output 324 of the sequence processor 314 to a parent processing node for further temporal processing and/or spatial pooling. Alternatively, the concatenated vector may be provided as an output of the temporal memory system or be further processed to identify a higher level cause of the input signal. The output generator 612 may also function as a buffer and synchronize signals from sibling processing nodes.

The bottom-up output 324 is also a vector in a sparse distributed representation. The percentage of active (or inactive) elements in the bottom-up output 324 may be any percentage, but the percentage is often less than approximately 10%.

In one embodiment, the output generator 612 collects the pooling outputs 622 and outputs an active cell (AC) vector (identifying activated cells) and a predicted active cell (PAC) vector identifying activated cells that were correctly predicted to become active. The output generator 612 identifies the predicted active cells by comparing a list of currently activated cells to a list of cells in the predictive state at a last time step before the current time step. The predicted cell vector includes those cells in common between the list of currently activated cells and the list of cells in the predictive state at the last time step. Because the predicted active cells are a subset of the activated cells (or include all the activated cells), the number of active elements in the first vector equals or exceeds the number of elements in the second vector.

Example Operation and Function of Cell in Sequence Processor

Sequence processor 314 performs temporal processing by selectively activating cells (and columns), and learning previous states of cell activations. As the learning at the cells progresses, the cells learn to anticipate spatial patterns in the bottom-up input 328 and correspondingly enter a predictive state before corresponding spatial patterns appear in bottom-up input 328, causing those cells to then transition to an activated state. When a cell transitions from a predictive state to an active state, the cell may remain in the active state for a time after the transition. As cells remains active for a longer time, the cells produce a more stable and invariant bottom-up output 314 to a parent node.

Figure 7:
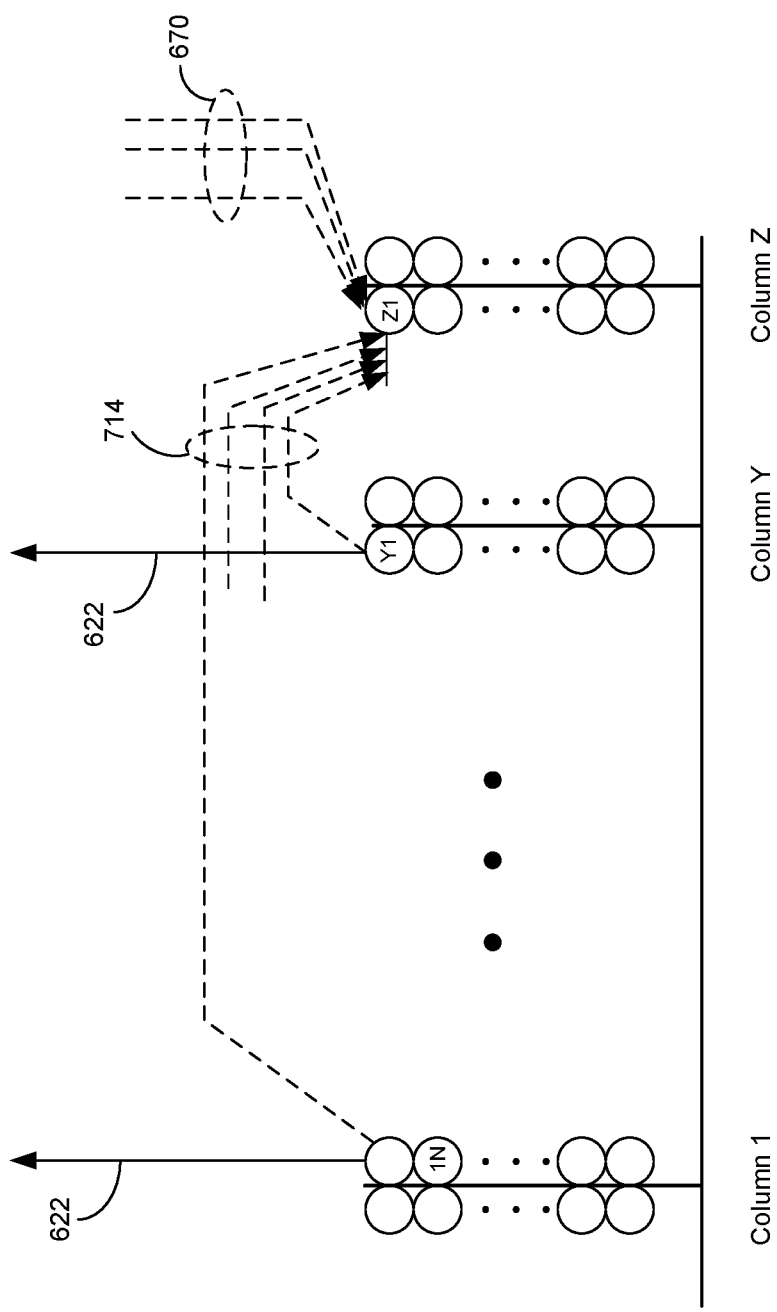
FIG. 7 is a conceptual diagram illustrating operation of columns of cells, according to one embodiment.

FIG. 7 is a diagram illustrating columns and output signals from the cells, according to one embodiment. Each circle in FIG. 7 represents a cell. When each cell becomes active, the cell sends out pooling output 622. An activated cell may also send out a sequence output 714 to other cells in the same processing node or level to indicate its activation state. A basic idea behind implementing temporal processing is to have a learning cell, upon activation, detect activation states of other cells, establish connections to these cells, and store the connections to these cells in a "temporal memory segment." That is, upon activation, the cell may establish lateral connections with other active cells in the same processing node or same level as the cell, and store the lateral connections in a temporal memory segment of the cell. The stored connections may be indicative of current activation states and/or previous activation states of the other cells. A "temporal memory segment" herein refers to a data structure for storing the lateral connections to other cells.

In storing the connections, the cell selects a subset of active cells, establishes lateral connections to the subset of active cells, and stores the lateral connections in temporal memory segments. A large number of cells in a processing node 300 may be active at the same time. Therefore, a large memory space may be needed to store lateral connections to all activated cells in the processing node. To reduce the memory requirement, a small number of active cells may be sub-sampled and connections to the sub-sampled cells may be stored in the temporal memory segments of the cell. For example, when cell Z1 is first activated, cell Z1 could receive activation states of all active cells (e.g., 50 cells) at this time step but stores connections to only a select number of cells (e.g., 10 cells). The sub-sampling of cells may also contribute to generalization of spatial patterns and/or temporal sequences.

In one embodiment, each temporal memory segment stores the lateral connections to the same number of cells. In another embodiment, each temporal memory segment stores the lateral connections to a different number of cells.

When a cell detects activation of a predetermined number or over a percentage of connected cells stored in its temporal memory segments, the cell enters into a predictive state and produces a pooling output 622 indicating its predictive state. This transition is predictive in nature because the transition to the predictive state is based on activation of other connected cells and not based on receiving a column activation signal (via select signal 646) to activate the cell.

For example, a cell may become predictive when more than 90% of connected cells identified in a temporal memory segment are active. Under certain conditions, the cell may also produce sequence output 714 sent to other cells to indicate its activation state. In one embodiment, a cell becomes predictive when a fixed number of cells or more than a threshold percentage of connected cells stored in one of its temporal memory segments become active. In other embodiments, the cells become predictive when the activation states of other cells partially or entirely match a list of stored connections to cells.

A cell may also receive feedback inputs 670 from one or more elements or cells from one or more upper processing nodes. The feedback inputs 670 may be provided by cells in a single upper processing node or a plurality of upper processing nodes. A learning cell in a lower processing node, upon activation, may detect activation states of cells in upper processing nodes and store connections to these cells in a "feedback memory segment." That is, upon activation, the cell may establish feedback connections with other active cells in upper processing nodes, and store the feedback connections in a feedback memory segment of the cell. The stored feedback connections may be indicative of current activation states and/or previous activation states of the other cells. A "feedback memory segment" herein refers to a data structure for storing the feedback connections to other cells in one or more upper processing nodes.

In storing the connections, the cell selects a subset of active cells in one or more upper processing nodes, establishes feedback connections to these subset of cells in the upper processing nodes, and stores the feedback connections in feedback memory segments. A large number of elements or cells in upper processing nodes may be active at the same time. Therefore, a large memory space may be needed to store connections to all activated cells in the processing node. To reduce the memory requirement, a small number of active cells may be sub-sampled and connections to the sub-sampled cells may be stored in the feedback memory segments of the cell.

In one embodiment, each feedback memory segment stores connections to the same number of cells. In another embodiment, each feedback memory segment stores connections to a different number of cells.

When a cell detects activation of some or a percentage of cells with connections to the cell stored in its feedback memory segments, the cell may enter into a predictive state. For example, a cell may become predictive when more than 90% of connected cells identified in a feedback memory segment are active. In one embodiment, a cell may become predictive when a fixed number of cells, or more than a threshold percentage of connected cells stored in one of its feedback memory segments become active. In other embodiments, the cell may become predictive when the activation states of other cells in the upper processing node partially or entirely match a list of stored connections.

Feedback inputs 670 from upper level processing nodes provide a more abstract-level representation of a temporal sequence, and improve robustness of performance related to predicting and/or detecting temporal sequences in input data by enabling the lower processing node to disambiguate among multiple possible input pattern predictions. Specifically, feedback inputs 670 may enhance the ability of the HTM to retain temporal context in the presence of deletion and substitution of input patterns for a given temporal sequence. For example, given two temporal sequences "ABCDE" and "XBCDF," a HTM trained without feedback inputs expects two possible patterns, "E" or "F" upon receiving the sequence "BCD." However, a HTM with feedback connections trained with the sequence "ABCDE" will likely predict the pattern "E" upon receiving the sequence "BCD," since the higher-order context of the sequence is retained.

Figure 8:
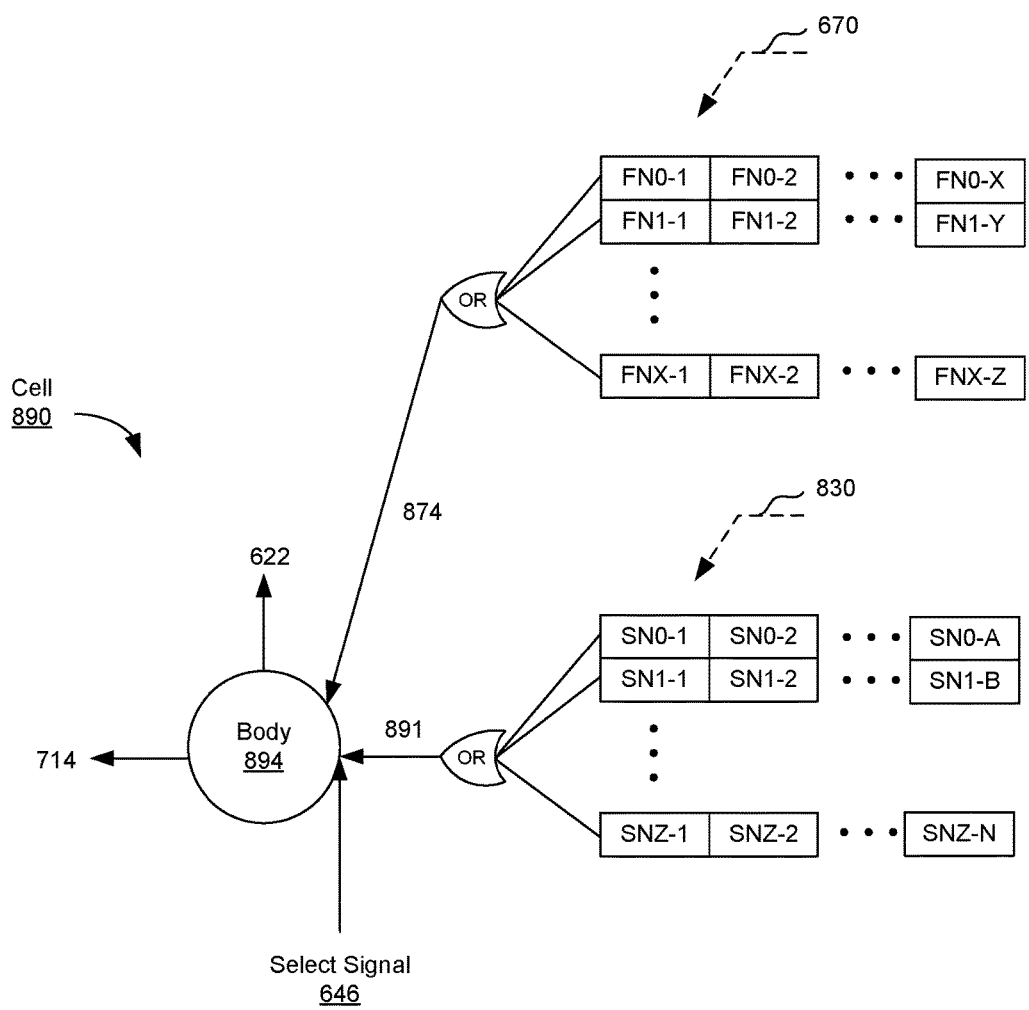
FIG. 8 is a conceptual diagram illustrating the operation of a cell, according to one embodiment.

FIG. 8 is a conceptual diagram illustrating signals associated with a cell 890, according to one embodiment. Cell 890 includes a body 894, an apical dendrite 874, and a distal dendrite 891. The distal dendrite 891 of cell 890 receives sequence inputs 830, the apical dendrite 874 of cell 890 receives feedback inputs 670, and the body 894 of cell 890 receives select signal 646. As discussed in reference to FIG. 7, sequence inputs 830 are collective sequence outputs 714 sent out by other cells connected with cell 890 and placed in the same processing node or a different processing node in the same level of hierarchy of processing nodes. Feedback inputs 670 are collective outputs sent out by other cells connected with cell 980 but are placed in one or more upper processing nodes. Cell 890 establishes connections with the other cells during learning by monitoring activation states of the other cells.

Cell 890 also receives select signal 646. In one embodiment, the select signal 646 becomes active when: (i) cell 890 is in a predictive state, then transitions to an active state in response to the column activation signal 634, and/or (ii) cell 890 is not in a predictive state but is nonetheless selected for activation in response to the column activation signal 634. For example, the column containing cell 890 receives a column activation signal 634 but no cells in the column are in a predictive state, so the column manager selects cell 890 as a candidate cell for learning. In this example, cell 890 may be selected as a candidate cell according to a ranking of cells in the column by likelihood of entering the predictive state.

As discussed in reference to FIG. 7, when cell 890 is activated and chosen as a candidate cell for learning, cell 890 establishes lateral connections between other cells activated at the previous time step or current time step that are in the same processing node or level and stores connections to these cells in a temporal memory segment of the cell 890. Cell 890 also establishes feedback connections to other cells (in one or more upper processing nodes) that are activated at the previous time step or current time step and stores connections to these cells in a feedback memory segment of the cell 890.

As shown in FIG. 8, connections to other connective cells in the same processing node or level that are associated with the cell 890 transitioning to the predictive state may be stored in temporal memory segments SN0-1 through SNZ-N. Different temporal memory segments may represent connections to other cells that were activated at different times. Cell 890 enters into a predictive state if cell 890 detects activation of all or over a percentage of connected cells stored in any of its temporal memory segments. Connections to other elements or cells in upper processing nodes that are associated with cell 890 may be stored in feedback memory segments FN0-1 through FNX-Z. Different feedback memory segments may represent connections to other cells that were activated at different times. Cell 890 may enter into a predictive state if cell 890 detects activation of a predetermined number of cells or over a percentage of cells stored in any of its feedback memory segments. Cell 890 generates pooling output 622 and sequence output 714 based on select signal 646 and sequence inputs 830. Pooling output 622 is generated whenever cell 890 becomes currently activated and/or predictively activated. Sequence output 714 is generated when certain conditions are met, as described below in detail with reference to FIG. 9.

Figure 9:
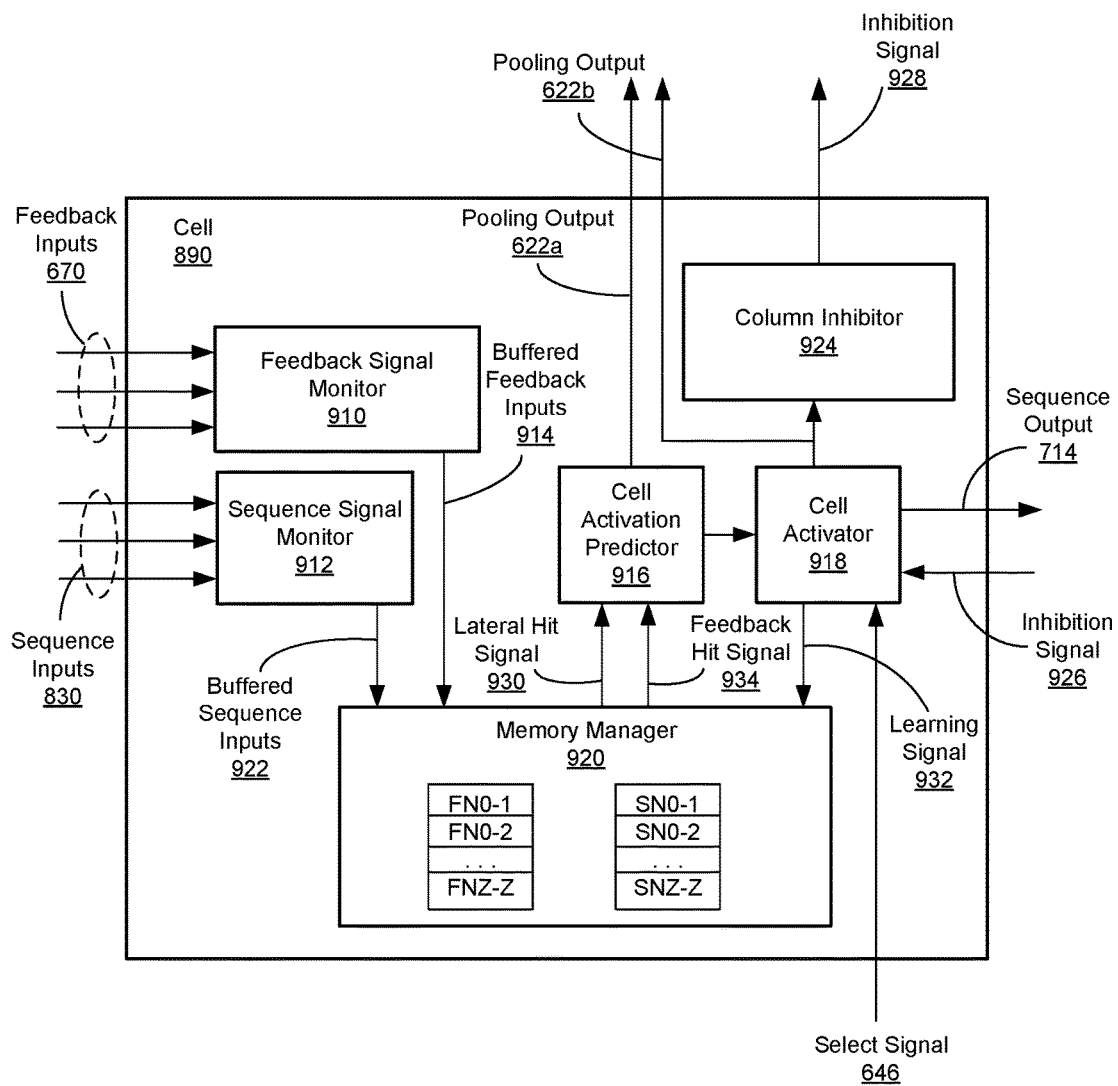
FIG. 9 is a block diagram illustrating a cell, according to one embodiment.

FIG. 9 is a functional block diagram illustrating cell 890, according to one embodiment. Cell 890 may include, among other components, a feedback signal monitor 910, a sequence signal monitor 912, a cell activation predictor 916, a cell activator 918, a memory manager (MM) 920, and a column inhibitor 924. The feedback signal monitor 910 is software, firmware, hardware or a combination thereof for receiving feedback inputs 670 from other cells in upper processing nodes or levels. The feedback signal monitor 910 buffers feedback inputs 914 before being stored in the MM. The stored feedback inputs are referenced by MM 920 for processing. The sequence signal monitor 912 is software, firmware, hardware or a combination thereof for receiving sequence inputs 830 from other cells in the same processing node or level. The sequence signal monitor 912 buffers sequence inputs 922 before being stored in the MM. The stored sequence inputs are also referenced by MM 920 for processing.

MM 920 is software, firmware, hardware, or a combination thereof for managing feedback memory segments and temporal memory segments. MM 920 performs various operations associated with writing, updating, retrieving, and comparing cell activation states. As described above in detail with reference to FIG. 8, connections to cells stored in different feedback and temporal memory segments of MM 920 represent connections to cells that were activated at different times. When learning is activated, MM 920 detects current and/or previous states of cell activations and stores connections to these cells in feedback and temporal memory segments. MM 920 also compares the sequence inputs 830 to connections stored in temporal memory segments and compares the feedback inputs 670 to connections stored in feedback memory segments.

If the sequence inputs 830 indicate that (i) all connected cells of a temporal memory segment are active or (ii) a number or percentage of connected cells of a temporal memory segment above a threshold is active, MM 920 sends lateral hit signal 930 to cell activation predictor 916. If the feedback inputs 670 indicate that (i) all connected cells of a feedback memory segment are active or (ii) a number or percentage of connected cells in the upper level corresponding to a feedback memory segment above a threshold is active, MM 920 sends feedback hit signal 934 to cell activation predictor 916. The lateral hit signal 930 and feedback hit signal 934 indicate that the cell 890 is in a predictive state due to activation of cells whose activation corresponded to subsequent predictive activation of the cell 890. The memory manager 920 may activate learning in response to (i) sending the lateral hit signal 930 or feedback hit signal 934 indicating that the cell 890 is in a predictive state, or (ii) receiving learning signal 932 indicating that the cell 890 in in an active state.

The feedback hit signal 934 may be a normal feedback hit signal 934 or a strong feedback hit signal 934, depending on the contribution of the connected cells in the feedback memory segments in predictively activating the cell 890. For example, a normal feedback hit signal 934 may be generated by activation of a single feedback memory segment. A strong feedback hit signal 934 may be generated by activation of multiple feedback memory segments, strongly indicating that the cell 890 should be predictively activated based on higher-level temporal context information. A strong feedback hit signal 934 may be in the form of feedback inputs 670 received by the cell 890 that simultaneously activate multiple feedback memory segments of the cell 890 or feedback input signals 670 received within a predetermined time interval or a predetermined number of time steps which activates the same memory segments of the cell 890 for a plurality of times. For example, a strong feedback hit signal 934 may be generated for a cell if two feedback memory segments are simultaneously activated. As another example, a strong feedback hit signal 934 may also be generated if activation of a feedback memory segment for a cell at time t is followed by another within a predetermined time interval or predetermined number of time steps. The subsequent activation may be of the same feedback memory segment activated at time t, or may be of a different feedback memory segment.

Cell activation predictor 916 receives lateral hit signal 930 and/or feedback hit signal 934 from MM 920 and generates pooling output 622a indicating that the cell 890 is in a predictive state. The cell activation predictor 916 may send indications of the cell's previous predictive states to the cell activator 918. For example, the cell activation predictor 916 indicates to the cell activator 918 whether the cell 890 was in a predictive state during a last time step.

The cell activator 918 receives the select signal 646 and the inhibition signal 926 and places the cell 890 in an activated state according to a set of activation and inhibition rules. The activation and inhibition rules are described in further detail in reference to FIG. 10 below. If the cell 890 is placed in an activated state, the cell activator 918 generates pooling output 622b, sequence output 714, and learning signal 932.

One condition for cell activation is that there be no inhibition signals 926 from other cells in the same column or in a different column. If inhibition signal 926 is received from other cells, cell 890 is not activated despite select signal 646. In one embodiment, pooling output 622b is generated regardless of the reasons cell 890 is activated whereas sequence output 714 is generated under certain conditions. Specifically, the sequence output 714 is generated (i) when the activation of cell 890 was predicted based on activation states of other cells and (ii) the prediction of the cell 890 turned out to be correct. By generating sequence output 714 only when the prediction of the cell 890 was correct, other cells connected to cell 890 learn temporal sequences that are productive to correct prediction while discarding meaningless or noisy temporal sequences that do not contribute to prediction. Alternatively, the sequence output 714 is generated even when the activation of the cell 890 was inaccurately predicted. The sequence output 714 and/or the pooling output 622b indicate that the cell 890 is activated for a longer time to enable more connected cells to learn the activation state of the cell 890 while the sequence output 714 is activated for a short time when the activation of the cell 890 was inaccurately predicted.

In response to activation of the cell 890 by the cell activator 918, column inhibitor 924 generates inhibition signal 928. Inhibition signals are sent to other cells in the same column or in a different column to inhibit activation of the other cells. The cells communicating the inhibition signals may be within a predefined inhibition range, as described above in detail with reference to FIG. 3.

Example Activation Rules of Cell in Sequence Processor

Figure 10:
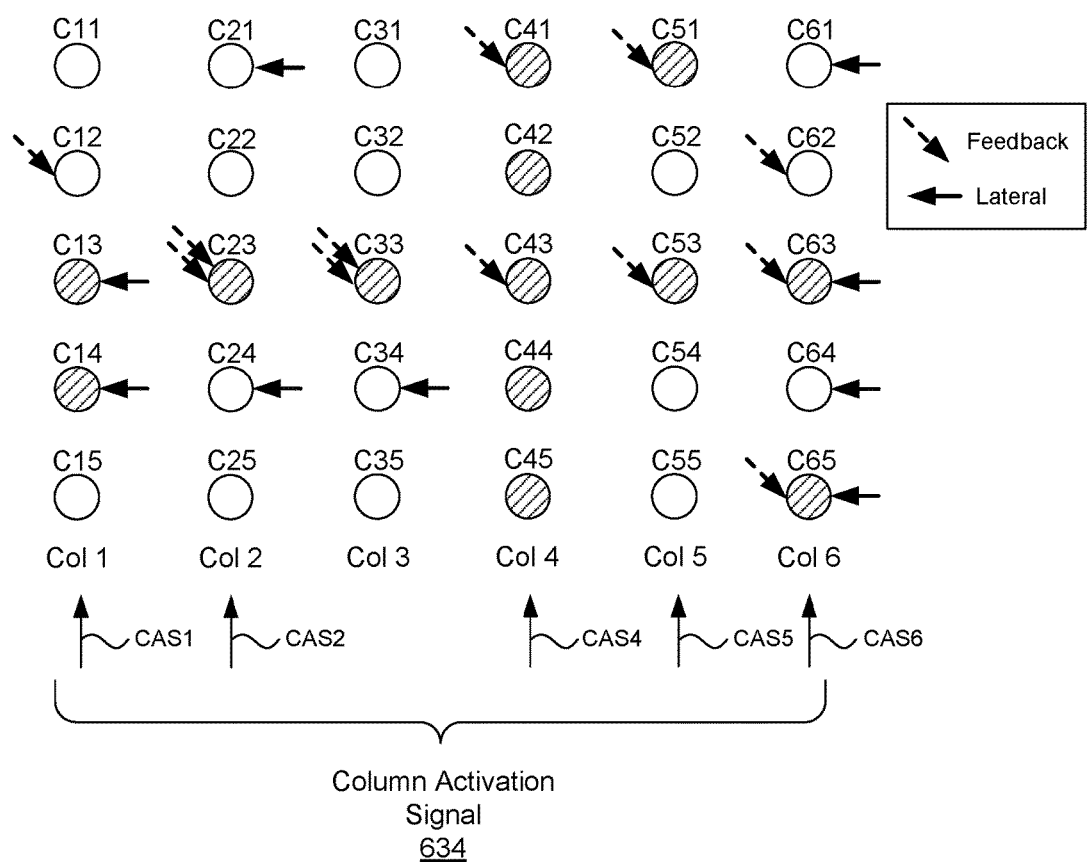
FIG. 10 is a diagram illustrating activating cells or inhibiting activation of cells based on various rules, according to embodiments.

FIG. 10 is a diagram illustrating activating cells or inhibiting activation of cells based on various rules, according to embodiments. In the example of FIG. 10, some of the cells generate feedback hit signal 934 and/or lateral hit signal 930. The cells are arranged in columns (columns 1 through 6) and some columns receive column activation signal CAS whereas some columns do not. "Feedback" arrows (dotted) indicate that the cell has generated feedback hit signal 934, and "Lateral" arrows (solid) indicate that the cell has generated lateral hit signal 930. As discussed above in detail with reference to FIGS. 6 through 8, if a column receives column activation signal 634, but does not contain any predictive cells, the column manager may active all of the cells or a subset of the cells in the column to become active. The rules associated with the operations of cells described below with reference to FIG. 10 are merely for illustration. One or more of these rules may be used in conjunction, selective selected or discarded, and/or varied during operation of the processing nodes.

One of the rules is to have cells that only generate lateral hit signal 930 to inhibit activation of cells that only generate feedback hit signal 934 in the same column. Cell C12, for example, generates feedback hit signal 934 and cells C13, C14 generate lateral hit signals 930. After receiving column activation signal CAS1, only cells C13 and C14 are activated whereas cell C12 is not activated because cells C13 and C14 (generating the later hit signal 930) inhibit the activation of cell C12 (generated only feedback hit signal 934).

Another rule is to have a cell generating a strong feedback hit signal 934 to inhibit a cell only generating a lateral hit signal 930 in the same column. As shown in FIG. 10, cells C21 and C24 generate lateral hit signals 930 and cell C23 generates a strong feedback hit signal 934 due to activation of multiple feedback memory segments. After receiving column activation signal CSA2, cell C23 is activated over cells C21 and C24 because the activation of cell C23 due to the strong feedback hit signal 934 causes the activation of cells C21 and C24 to be inhibited.

A rule may also be implemented to activate a cell generating a strong feedback hit signal 934 even though a column activation signal 634 is not received for that column. As shown in FIG. 10, identical to cell C23, cell C33 generates feedback hit signal 934 due to activation of multiple feedback memory segments. Cell C33 is activated even though the corresponding column does not receive a column activation signal 634 in the subsequent time step.

Another rule is to activate all cells in a column upon receiving the column activation signal 634 if there are no cells that generate lateral hit signal 930. As shown in column 4, although cells C41 and C43 generate feedback hit signals 934, all cells in the column is activated after receiving the column activation signal CAS4 because there is no cell in column 4 that generates lateral hit signal 930.

An alternative rule may be implemented instead so that, if there are cells that only generate feedback hit signal 934, these cells are activated after receiving a column activation signal 634. As shown in column 5, no cells generate lateral hit signal 930, and only cells C51 and C53 generate the feedback hit signal 934. According to the alternative rule, only cells C51 and C53 are activated after receiving the column activation signal 634 instead of all cells in column 5.

A rule may also have a cell generating both lateral hit signal 930 and feedback hit signal 934 to inhibit all activation of other cells that do not generate both hit signals in the same column. As shown in column 6, cells C63 and C65 generate both lateral hit signal 930 and feedback hit signal 934. Although cells C61, C62, and C64 generate individual lateral hit signals 930 or feedback hit signals 934, only cells C63 and C65 are activated after receiving column activation signal 634.

Example Method of Performing Temporal Processing

Figure 11:
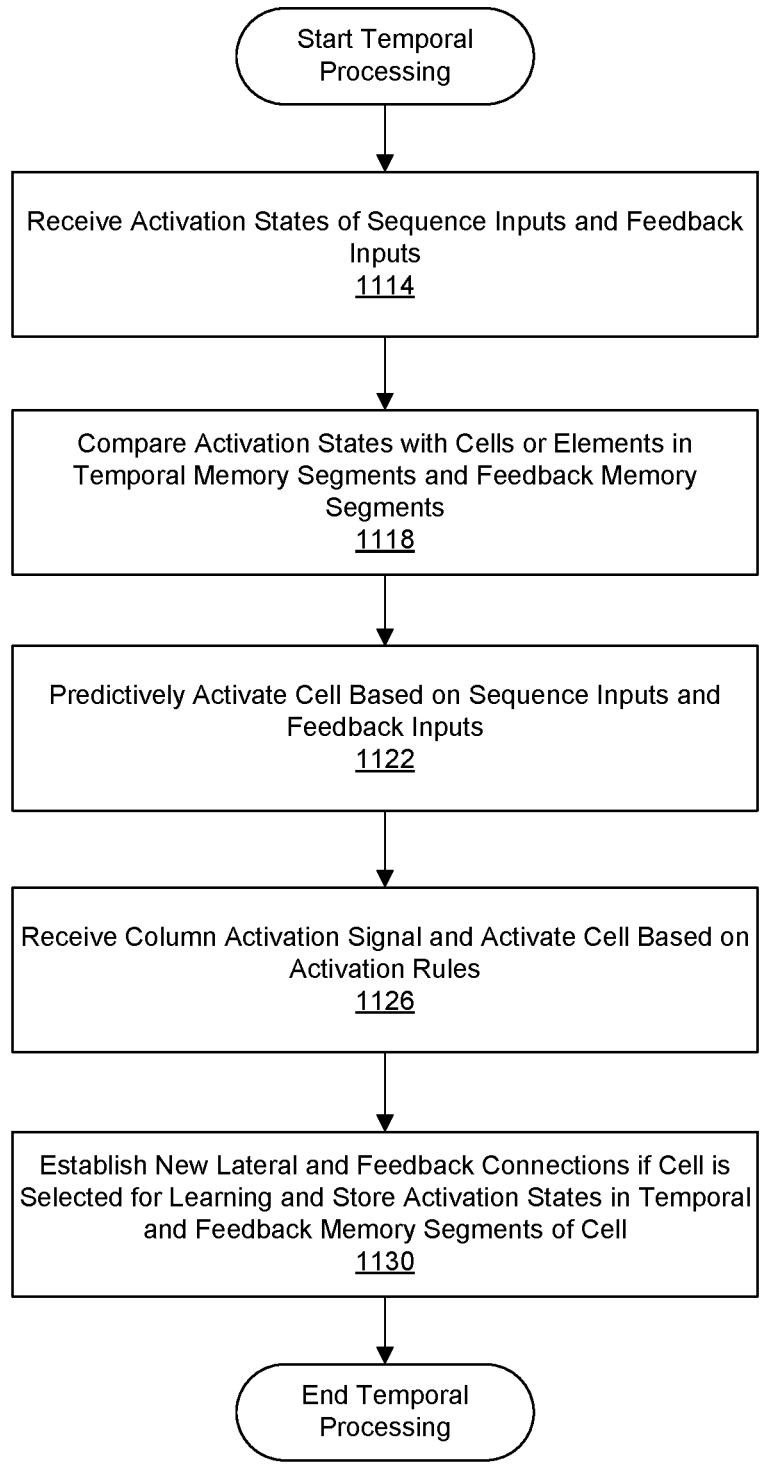
FIG. 11 is a flowchart illustrating a method of performing temporal processing in a processing node, according to one embodiment.

FIG. 11 is a flowchart illustrating a method of performing temporal processing in processing node 300, according to one embodiment. The cells in the sequence processor 314 receive 1114 sequence inputs from lateral connections and feedback inputs from feedback connections indicating activation states of connected cells. For each cell, the activation states of the received sequence inputs and feedback inputs are compared 1118 with the connected cells stored in its temporal memory segments and feedback memory segments.

Cells that generate lateral hit signal 930 and feedback hit signal 934 based on the received sequence inputs and feedback inputs are predictively activated 1122. The sequence processor 314 receives 1126 column activation signals and cells in the sequence processor are activated according to activation and inhibition rules.

Cells that are activated and selected for learning establish 1130 new lateral connections to other cells in the same level that were activated at previous or current time steps, and/or new feedback connections to other active cells in upper levels that were activated at previous or current time steps. The lateral connections and feedback connections are stored in temporal memory segments or feedback memory segments of the learning cell.

Thresholds for Generating Lateral and Feedback Hit Signals

Returning to FIG. 9, MM 920 may use a dynamic threshold for generating lateral hit signal 930 and/or feedback hit signal 934. Specifically, MM 920 dynamically adjusts the number or percentage of elements of sequence inputs 830 and feedback inputs 670 that should match the connected cells stored in a temporal memory segment, feedback memory segment, or an activation window before lateral hit signal 930 and feedback hit signal 934 can be generated.

The cell 890 transitioning to a predictive state represents a prediction based on activation of other cells in sequence processor 314 or other cells in upper processing nodes. By lowering the number of percentage of coinciding elements to generate lateral hit signal 930 and feedback hit signal 934, the cell 890 may be activated more frequently. More frequent transitions of the cell 890 to the predictive state indicate making more liberal predictions for when the cell will be activated. Lowering the requirement for coinciding elements has a similar effect of forcing the cells or the temporal memory system to make predictions that would otherwise not be made. To the contrary, raising the requirement for coinciding elements has a similar effect of restricting the cells or the temporal memory system to making only conservative and limited predictions.

The threshold for generating the lateral hit signal 930 or feedback hit signal 934 may be adjusted by detecting activation states of connected cells corresponding to a certain segment of input space. If the level of cell activation for such a segment drops below a level, the dynamic threshold of cells for the segment of input space is lowered to prompt more transitions to the predictive state by cells. Conversely, if the level of cell activation of a segment of input space it above a level, the dynamic threshold may be increased to reduce transitions to the predictive state by cells.

In one embodiment, MM 920 compares the activation and predictive states of cell 890 to the column activation signal 634 to determine if the lateral and feedback connections stored in a temporal memory segment or a feedback memory segment resulted in improper transitions by cell 890 to the predictive state.

Learning of Lateral Connections and Feedback Connections

The connection between the cell 890 and each cell in its temporal memory segments may be controlled by permanence values. The permanence value in the context of temporal memory segments represents the contribution of a connected cell in a sequence processor to the activation of cell 890. If a connection to a cell stored in a temporal memory segment caused the cell 890 to become predicted active and resulted in correct activation of the cell 890, the permanence values for connections to the active cells in the temporal memory segment are increased whereas the permanence values for connections to the inactive cells is decreased. On the other hand, if connections to cells stored in a temporal memory segment caused the cell 890 to become predicted active but was not followed by activation of cell 890, the permanence values for connections to the active cells in the temporal memory segment are decreased.

If a permanence value for a connection to a cell in the temporal memory segment drops below a threshold value, the connection between cell 890 and the cell in the temporal memory segment may be severed, so the activation of the connected cell in the temporal memory segment no longer contributes to activation of cell 890. An initial permanence value is applied when cell 890 learns a new lateral connection to another cell upon activation and learning of cell 890.

Similarly, the connection between the cell 890 and each connected element in its feedback memory segments may also be controlled by permanence values. The permanence value in the context of feedback memory segments represents the contribution of a connected cell in the upper processing nodes to the activation of cell 890. If connections to cells stored in a feedback memory segment caused the cell 890 to become predicted active and resulted in correct activation of the cell 890, the permanence values for connections to the active cells in the feedback memory segment are increased whereas the permanence values for connections to the inactive cells is decreased. On the other hand, if connections to cells stored in a feedback memory segment caused the cell 890 to become predicted active but was not followed by activation of cell 890, the permanence values for connections to the active cells in the feedback memory segment are decreased.

If a permanence value for a connection to an element or cell in the feedback memory segment drops below a threshold value, the connection between cell 890 and the element or cell in the feedback memory segment may be severed, so that the activation of the element or cell in the feedback memory segment no longer contributes to activation of cell 890. An initial permanence value is applied when cell 890 learns a new connection to another cell or element in the upper processing nodes upon activation and learning of cell 890.

Figure 12:
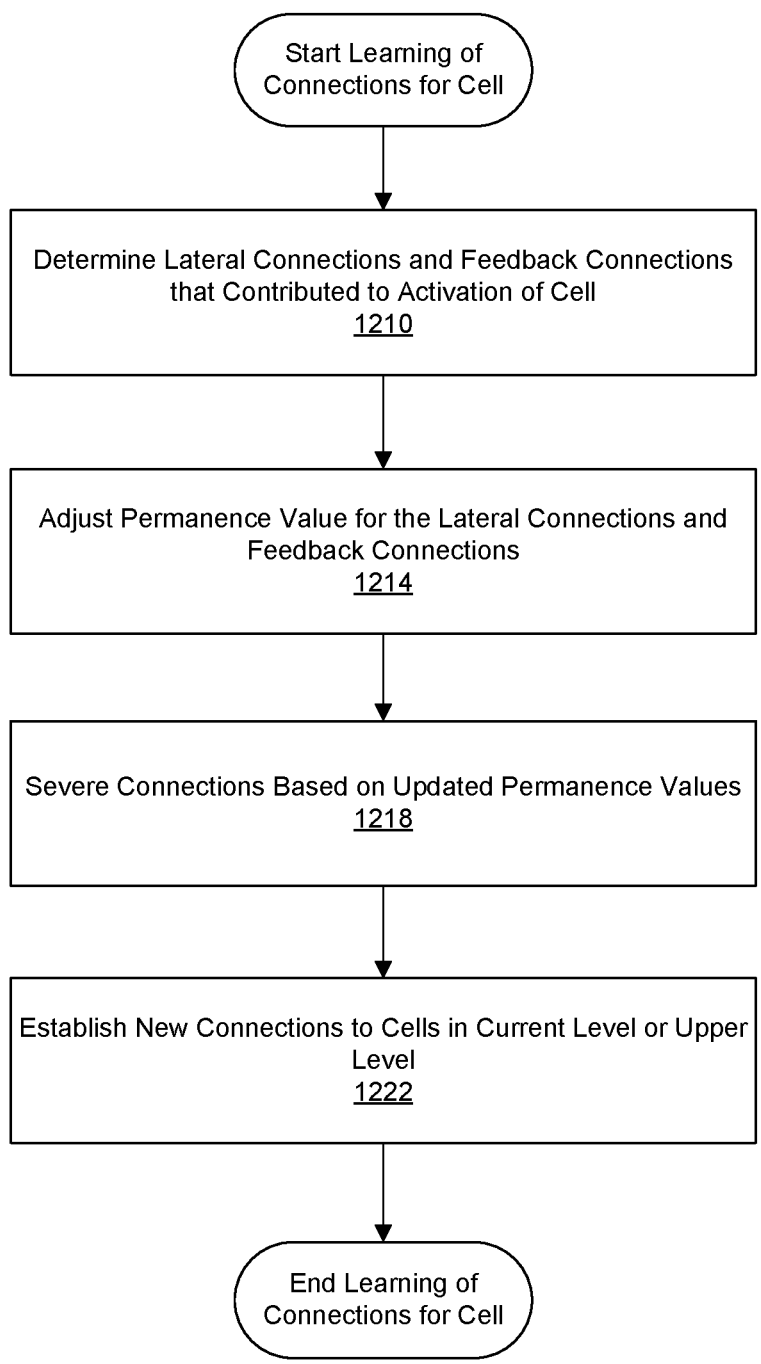
FIG. 12 is a flowchart illustrating a method of learning lateral and feedback connections by a cell in the processing node, according to one embodiment.

FIG. 12 is a flowchart illustrating a method of learning feedback and lateral connections for a cell in the processing node 300, according to one embodiment. When a cell becomes activated, it is determined 1210 which feedback connections and lateral connections contributed to the activation of the cells.

The permanence values of the feedback connections and the lateral connections are then adjusted 1214. For example, permanence values assigned to feedback connections and lateral connections that contributed to activation of the cell is increased whereas permanence values assigned to feedback connections and lateral connections that did not contribute to the activation of the cell is decreased.

Based on the updated permanence values of the connections, the connections may be severed 1218 (i.e., the connections may be "forgotten"). For example, if the permanence value assigned to a connection drops below a threshold, such connection is severed.

In place of the severed connections, new connections may be established 1222 with other cells in the current level or the upper level. To establish the new connections, cells in the current level or the upper level that are active when the learning cell became active are determined. Then new connections are made to a subset of other cells that were active when the learning cell became active. Selection as to the cells being connected to the learning cell may be random or based on a predetermined set of rules.

Figure 13:
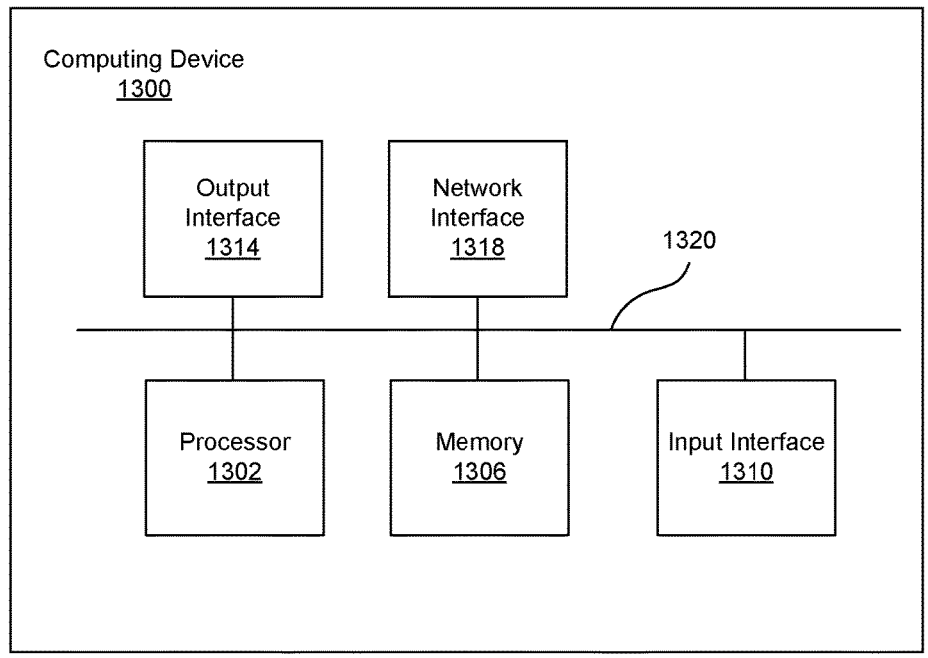
FIG. 13 is a block diagram of a computing device for implementing processing nodes according to embodiments.

FIG. 13 is a block diagram of a computing device 1300 for implementing nodes according to embodiments. The computing device 1300 may include, among other components, a processor 1302, a memory 1306, an input interface 1310, an output interface 1314, a network interface 1318 and a bus 1320 connecting these components. The processor 1302 retrieves and executes commands stored in memory 1306. The memory 1306 store software components including, for example, operating systems and modules for instantiating and executing nodes as described herein. The input interface 1310 receives data from external sources such as sensor data or action information. The output interface 1314 is a component for providing the result of computation in various forms (e.g., image or audio signals). The network interface 1318 enables the computing device 1300 to communicate with other computing devices by a network. When multiple nodes or components of a single node is embodied in multiple computing devices, information associated with temporal sequencing, spatial pooling and management of nodes may be communicated between computing devices via the network interface 1318.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

The invention claimed is:

1. A computer-implemented method comprising:
   receiving input data that change over time at a first processing node;
   generating a series of sparse distributed vectors over time based on the input data at the first processing node;
   performing temporal processing on the series of sparse distributed vectors at the first processing node by at least:
      receiving first feedback inputs from a second processing node via first feedback connections,
      placing each of a first subset of cells in the first processing node in a predictive state responsive to receiving the first feedback inputs,
      activating a select subset of cells in the first subset of cells placed in the predictive state responsive to the select subset of cells receiving signals from a set of sparse distributed vectors,
      transmitting first sequence inputs via lateral connections within the first processing node, the first sequence inputs representing activation of the select subset of cells in the first processing node,
      determining whether one or more learned temporal sequences of spatial patterns are included in the input data based on the transmitted first sequence inputs and the received first feedback inputs; and
   generating output data based on the temporal processing, the output data indicating at least prediction or detection of one or more spatial patterns or one or more temporal sequences in the input data.

2. The method of claim 1, wherein each of the cells in the select subset of cells is connected to a second subset of other cells via one or more of the lateral connections, wherein each of the cells in the select subset of cells transmits the first sequence inputs to the second subset of other cells via the one or more lateral connections responsive to activation of each of the cells in the select subset of cells.

3. The method of claim 1, further comprising activating another select subset of cells, wherein each of the cells in the another select subset of cells is activated based on at least one of (i) a sparse vector having an active element corresponding to a column to which each of the cells in the another select subset of cells is assigned, (ii) second sequence inputs received by each of the cells in the another select subset of cells from a predetermined number or portion of a set of lateral connections associated with each of the cells, and (iii) each of the cells in the another select subset of cells in the first processing node receiving second feedback inputs through a predetermined number or portion of a first set of the second feedback connections, the output data indicating at least whether each of the cells in the another select subset of cells or a column of each of the cells in the another select subset of cells is activated.

4. The method of claim 3, wherein each of the cells in the another select subset of cells is activated responsive to receiving the second feedback inputs through the predetermined number or portion of the first set of the second feedback connections and responsive to receiving third feedback inputs through a predetermined number or portion of a second set of the second feedback connections without receiving the second sequence inputs at each cell via the predetermined number or portion of the set of lateral connections associated with each of the cells.

5. The method of claim 4, wherein each of the cells in the another select subset of cells is activated responsive to receiving the second feedback inputs and the third feedback inputs within a predetermined number of time steps or a predetermined time interval.

6. The method of claim 1, further comprising, responsive to determining that the one or more learned temporal sequences are included in the input data, establishing second feedback connections between the first processing node and the second processing node, the second feedback connections representing relationships between the one or more learned temporal sequences and one or more temporal sequences in the output data detected by the second processing node.

7. The method of claim 1, further comprising:
assigning a permanence value to each of the first feedback connections;
adjusting the permanence value depending on whether the one or more learned temporal sequences are included in the input data; and
determining whether to retain or sever each of the first feedback connections based on the permanence value.

8. The method of claim 7, wherein adjusting the permanence value of each of the first feedback connections comprises:
increasing the permanence value of each of the first feedback connections that contributes to correctly predicting that the one or more learned temporal sequences are included in the input data; and
decreasing the permanence value of each of the first feedback connections that do not contribute to correctly predicting that the one or more learned temporal sequences are included in the input data,
wherein one or more of the first feedback connections is severed responsive to permanence values associated with the one or more of the first feedback connections dropping below a threshold value.

9. The method of claim 8, responsive to severing the one or more first feedback connections, establishing second feedback connections based on detection of one or more learned temporal sequences in the input data.

10. The method of claim 1, further comprising:
generating another series of sparse distributed vectors over time at the second processing node based on the output data received from the first processing node; and
performing temporal processing on the other series of sparse distributed vectors at the second processing node by at least:
generating second sequence inputs varying over time based on the other series of sparse distributed vectors,
generating the first feedback inputs based on the second sequence inputs, and
determining whether one or more learned temporal sequences are included in the input data based at least on the other series of sparse distributed vectors.

11. The method of claim 10, wherein performing the temporal processing at the second processing node comprises activating a subset of cells arranged by columns in the second processing node, the first feedback inputs and the second sequence inputs representing activation of the subset of cells in the second processing node.

12. A computing device comprising:
a processor; and
a memory operably coupled to the processor, the memory storing an instance of a first processing node, the first processing node comprising:
a spatial pooler configured to receive input data that change over time, and generate a series of sparse distributed vectors over time based on the input data; and
a sequence processor configured to:
perform temporal processing on the series of sparse distributed vectors at the first processing node,
receive first feedback inputs from a second processing node via first feedback connections,
place each of a first subset of cells in the first processing node in a predictive state responsive to receiving the first feedback inputs,
activate a select subset of cells in the first subset of cells placed in the predictive state responsive to the select subset of cells receiving signals from a set of sparse distributed vectors,
transmit first sequence inputs via lateral connections within the first processing node, the first sequence inputs representing activation states of the select subset of cells in the first processing node,
determine whether one or more learned temporal sequences of spatial patterns are included in the input data based on the transmitted first sequence inputs and the received first feedback inputs, and
send output data to the second processing node for performing at least temporal processing on the output data, the output data indicating at least prediction or detection of one or more spatial patterns or one or more temporal sequences in the input data.

13. The computing device of claim 12, wherein each of the cells in the select subset of cells is connected to a second subset of other cells via one or more of the lateral connections, wherein each of the cells in the select subset of cells transmits the first sequence inputs to the second subset of other cells via the one or more lateral connections responsive to activation of each of the cells in the select subset of cells.

14. The computing device of claim 12, further comprising activating another select subset of cells, wherein the sequence processor is further configured to activate each of the cells in the another select subset of cells based on at least one of (i) a sparse vector having an active element corresponding to a column to which each of the cells in the another select subset of cells is assigned, (ii) second sequence inputs received by each of the cells in the another select subset of cells from a predetermined number or portion of a set of lateral connections associated with each of the cells, and (iii) each of the cells in the another select subset of cells in the first processing node receiving second feedback inputs through a predetermined number or portion of a first set of the second feedback connections, the output data indicating at least whether each of the cells in the another select subset of cells or a column of each of the cells in the another select subset of cells is activated.

15. The computing device of claim 14, wherein the sequence processor is further configured to activate each of the cells in the another select subset of cells responsive to receiving the second feedback inputs through the predetermined number or portion of the first set of the second feedback connections and responsive to receiving third feedback inputs through a predetermined number or portion of a second set of the second feedback connections without receiving the second sequence inputs via the predetermined number or portion of the set of lateral connections associated with each of the cells.

16. The computing device of claim 15, wherein each of the cells in the another select subset of cells is activated responsive to receiving the second feedback inputs and the third feedback inputs within a predetermined number of time steps or a predetermined time interval.

17. The computing device of claim 12, wherein the sequence processor is further configured to establish second feedback connections between the first processing node and the second processing node responsive to determining that the one or more learned temporal sequences are included in the input data, the second feedback connections representing relationships between the one or more learned temporal sequences and one or more temporal sequences in the output data detected by the second processing node.

18. The computing device of claim 12, wherein the sequence processor is further configured to:
assign a permanence value to each of the first feedback connections;
adjust the permanence value depending on whether the one or more learned temporal sequences are included in the input data; and
determine whether to retain or sever each of the first feedback connections based on the permanence value.

19. The computing device of claim 18, wherein the sequence processor is further configured to:
increase the permanence value of each of the first feedback connections that contributes to correctly predicting that the one or more learned temporal sequences are included in the input data; and
decrease the permanence value of each of the first feedback connections that do not contribute to correctly predicting that the one or more learned temporal sequences are included in the input data,
wherein one or more of the first feedback connections is severed responsive to permanence values associated with the one or more of the first feedback connections dropping below a threshold value.

20. The computing device of claim 19, wherein the sequence processor is further configured to establish second feedback connections based on detection of one or more learned temporal sequences in the input data responsive to severing the one or more first feedback connections.

21. The computing device of claim 12, wherein the second processing node comprises:
an upper spatial pooler configured to generate another series of sparse distributed vectors over time based on the output data received from the first processing node; and
an upper sequence processor configured to perform temporal processing on the other series of sparse distributed vectors at the second processing node by at least:
generating second sequence inputs varying over time based on the other series of sparse distributed vectors,
generating the first feedback inputs based on the second sequence inputs, and
determining whether one or more learned temporal sequences are included in the input data based at least on the other series of sparse distributed vectors.

22. The computing device of claim 21, wherein the upper sequence processor is configured to perform the temporal processing at the second processing node by at least activating a subset of cells arranged by columns in the second processing node, the first feedback inputs and the second sequence inputs representing activation of the subset of cells in the second processing node.

23. A non-transitory computer readable storage medium comprising instructions when executed by a processor cause the processor to instantiate a first processing node, the first processing node configured to:
receive input data that change over time at the first processing node;
generate a series of sparse distributed vectors over time based on the input data at the first processing node;
perform temporal processing on the series of sparse distributed vectors at the first processing node by at least:
receiving first feedback inputs from a second processing node via first feedback connections,
placing each of a first subset of cells in the first processing node in a predictive state responsive to receiving the first feedback inputs,
activating a select subset of cells in the first subset of cells placed in the predictive state responsive to the select subset of cells receiving signals from a set of sparse distributed vectors,
transmitting first sequence inputs via lateral connections within the first processing node, the first sequence inputs representing activation of the select subset of cells in the sequence processor,
determining whether one or more learned temporal sequences of spatial patterns are included in the input data based on the transmitted first sequence inputs and the received first feedback inputs; and
send output data to the second processing node for performing at least temporal processing on the output data, the output data indicating at least prediction or detection of one or more spatial patterns or one or more temporal sequences in the input data.

* * * * *